(12) United States Patent
Watfa

(10) Patent No.: US 10,264,429 B2
(45) Date of Patent: Apr. 16, 2019

(54) SYSTEMS, METHODS AND INSTRUMENTALITIES FOR ENABLING MACHINE TYPE COMMUNICATION GROUP COMMUNICATION

(71) Applicant: INTERDIGITAL PATENT HOLDINGS, INC., Wilmington, DE (US)

(72) Inventor: Mahmoud Watfa, Saint Leonard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/309,139

(22) PCT Filed: May 7, 2015

(86) PCT No.: PCT/US2015/029682
§ 371 (c)(1),
(2) Date: Nov. 4, 2016

(87) PCT Pub. No.: WO2015/171890
PCT Pub. Date: Nov. 12, 2015

(65) Prior Publication Data
US 2017/0078828 A1 Mar. 16, 2017

Related U.S. Application Data

(60) Provisional application No. 61/990,047, filed on May 7, 2014.

(51) Int. Cl.
*H04W 72/04* (2009.01)
*H04W 4/70* (2018.01)
(Continued)

(52) U.S. Cl.
CPC ............... *H04W 4/70* (2018.02); *H04W 4/14* (2013.01); *H04W 8/005* (2013.01); *H04W 76/14* (2018.02); *H04W 88/16* (2013.01); *H04W 92/18* (2013.01)

(58) Field of Classification Search
None
See application file for complete search history.

(56) References Cited

U.S. PATENT DOCUMENTS 9,319,127 B2 * 4/2016 Kim ...................... H04W 36/00
9,585,178 B2 * 2/2017 Liao ........................ H04L 67/16
(Continued)

FOREIGN PATENT DOCUMENTS

| JP | 2012-514435 A | 6/2012 |
|---|---|---|
| WO | WO 2012/127440 A1 | 9/2012 |
| WO | WO 2014/002351 A1 | 1/2014 |

OTHER PUBLICATIONS

3rd Generation Partnership Project (3GPP); TR 22.803 V12.2.0, "3rd Generation Partnership Project; Technical Specification Group Services and System Aspects; Feasibility study for Proximity Services (ProSe) (Release 12)", Jun. 2013, 1-45 pages.
(Continued)

*Primary Examiner* — Sithu Ko
(74) *Attorney, Agent, or Firm* — Condo Roccia Koptiw LLP

(57) ABSTRACT

Systems, methods, and instrumentalities are disclosed to enable Machine Type Communication (MTC) group communication in 3 GPP. For example, a wireless transmit/receive unit may be used for MTC group communication. The WTRU may contain a processor configured to receive a trigger, such as an SMS trigger. The WTRU may contact a server, such as an Application Server or Proximity based Service function. The WTRU may request additional information from a server. The WTRU may receive information
(Continued)

from a server. The WTRU may trigger one or more WTRUs, for example, based on the information received from the server.

20 Claims, 22 Drawing Sheets

(51) Int. Cl.
*H04W 76/14* (2018.01)
*H04W 4/14* (2009.01)
*H04W 8/00* (2009.01)
*H04W 88/16* (2009.01)
*H04W 92/18* (2009.01)

(56) References Cited

U.S. PATENT DOCUMENTS

| | | | |
|---|---|---|---|
| 9,769,644 B2* | 9/2017 | He | H04W 72/02 |
| 2010/0165882 A1 | 7/2010 | Palanki et al. | |
| 2013/0155954 A1 | 6/2013 | Wang et al. | |
| 2013/0203412 A1 | 8/2013 | Starsinic et al. | |
| 2013/0339438 A1 | 12/2013 | Cherian et al. | |
| 2014/0112251 A1 | 4/2014 | Kim et al. | |
| 2015/0382157 A1* | 12/2015 | Xu | H04W 4/06 370/312 |
| 2016/0128116 A1* | 5/2016 | Kim | H04W 76/14 370/329 |
| 2017/0111781 A1* | 4/2017 | Zhu | H04W 8/005 |

OTHER PUBLICATIONS

3rd Generation Partnership Project (3GPP); TR 22.888 V12.0.0, "3rd Generation Partnership Project; Technical Specification Group Services and System Aspects; Study on enhancements for Machine-Type Communications (MTC) (Release 12)", Mar. 2013, 1-22 pages.
3rd Generation Partnership Project (3GPP); TR 23.887 V12.0.0, "3rd Generation Partnership Project; Technical Specification Group Services and System Aspects; Study on Machine-Type Communications (MTC) and other mobile data applications communication enhancements (Release 12)", Dec. 2013, 1-151 pages.
3rd Generation Partnership Project (3GPP); TS 23.303 V12.0.0, "3rd Generation Partnership Project; Technical Specification Group Services and System Aspects; Proximity-based services (ProSe); Stage 2 (Release 12)", Feb. 2014, 1-53 pages.
3rd Generation Partnership Project (3GPP); S2-141505, "New WID on Group based enhancements", Intel, Huawei, InterDigitial, LG electronics, KPN, Alcatel-Lucent, ZTE, NTT DOCOMO, Silver Spring Networks, CATT, HTC, NEC, KDDI, Cisco, China Mobile, Qualcomm, Samsung, Fujitsu, Acision, China Unicorn, 3GG SA WG2, Meeting # 102, St. Julian's, Malta, Mar. 24-28, 2014, 1-5 pages.
3rd Generation Partnership Project (3GPP); TS 22.368 V12.3.0, "3rd Generation Partnership Project; Technical Specification Group Services and System Aspects; Service requirements for Machine-Type Communications (MTC); Stage 1 (Release 12)", Dec. 2013, 1-25 pages.
3rd Generation Partnership Project (3GPP); TS 23.682 V12.1.0, "3rd Generation Partnership Project; Technical Specification Group Services and System Aspects; Architecture enhancements to facilitate communications with packet data networks and applications (Release 12)", Mar. 2014, 1-32 pages.
3rd Generation Partnership Project (3GPP); TS 23.040 V12.2.0, "3rd Generation Partnership Project; Technical Specification Group Core Network and Terminals; Technical realization of the Short Message Service (SMS) (Release 12)", Dec. 2013, 1-209 pages.
3rd Generation partnership Project (3GPP), S2-140577, "Consolidated Annexes for TS 23.303", Qualcomm Incorporated, SA WG2 Meeting #101bis, San Jose Del Cabo, Mexico, Feb. 17-21, 2014, 40 pages.

* cited by examiner

SYSTEMS, METHODS AND INSTRUMENTALITIES FOR ENABLING MACHINE TYPE COMMUNICATION GROUP COMMUNICATION

CROSS-REFERENCE TO RELATED APPLICATIONS

This application is the National Stage Entry under 35 U.S.C. § 371 of Patent Cooperation Treaty Application No. PCT/US2015/029682, filed May 7, 2015, which claims the benefit of U.S. Provisional Patent Application No. 61/990,047, filed May 7, 2014, the contents of which are hereby incorporated by reference herein.

BACKGROUND

Proximity services may relate to direct communication between devices such as wireless transmit/receive devices, which may include machine type communication (MTC) devices. Group triggering may require large amounts of information to be sent and generate signaling at various levels of the system.

SUMMARY

Systems, methods, and instrumentalities are disclosed to enable Machine Type Communication group communication in 3GPP.

A wireless transmit/receive unit (WTRU) may have memory and a processor. For example, the WTRU may have a processor configured to receive a machine-type communication (MTC) triggering message from a service capability server (SCS) or application server (AS). The MTC triggering message may comprise an indication that the MTC triggering message is applicable to a second WTRU. The WTRU may have a processor configured to determine a group identification for the second WTRU based on the MTC triggering message. The WTRU may have a processor configured to translate the determined group identification for the second WTRU to an individual WTRU identification for the second WTRU. The WTRU may have a processor configured to send the MTC triggering message to the second WTRU. The WTRU may have a processor configured to receive a confirmation indication from the second WTRU.

The WTRU may have a processor configured to send, to a mobility management entity (MME), a first non-access spectrum (NAS) message. The first NAS message may indicate that the WTRU is capable of acting as a gateway WTRU (GWTRU). The first NAS message may be an Attach Request message or a Tracking Area Update Request message. The WTRU may have a processor configured to receive, from an evolved NodeB (eNB), a radio resource control (RRC) message. The RRC message may include a GWTRU configuration. The GWTRU configuration may be used to configure the WTRU to act as a GWTRU. The WTRU may have a processor configured to receive, from the MME, a second NAS message. The second NAS message may indicate that the WTRU may act as the GWTRU. The second NAS message may be an Attach Accept message or a Tracking Area Update Accept message. The WTRU may have a processor configured to send, to the MME, a message indicating that the WTRU may stop acting as a GWTRU.

The WTRU may have a processor configured to send, to an evolved NodeB (eNB), a first radio resource control (RRC) message. The first RRC message may indicate that the WTRU may be capable of acting as a gateway WTRU (GWTRU). The WTRU may have a processor configured to receive, from an evolved NodeB (eNB), a second radio resource control (RRC) message. The second RRC message may include a configuration for the WTRU that may allow the WTRU to act as the GWTRU. The WTRU may have a processor configured to send, to the eNB, a message indicating that the WTRU may stop acting as a GWTRU.

The WTRU may have a processor configured to send, to the SCS or AS, an indication that the WTRU is capable of acting as a gateway WTRU (GWTRU). The WTRU may have a processor configured to receive, from a proximity based service (ProSe) server, an indication to act as a GWTRU. The WTRU may have a processor configured to receive, from the SCS or AS, an application layer message. The application layer message may include a configuration for the WTRU that may allow the WTRU to act as a GWTRU.

The MTC triggering message may be an SMS message. The SMS message may include an information element. The information element may include an indication that the SMS message is applicable to the plurality of WTRUs. The information element may be in the transfer protocol (TP) header or the control protocol (CP) header. The MTC triggering message may include an action indication for the WTRU or at least one of the plurality of WTRUs. The action indication may be an instruction for WTRU to initiate contact with the AS, initiate contact with at least one of the plurality of WTRUs over a PC5 reference point, or the like.

The MTC triggering message may comprise an indication that the MTC triggering message is applicable to a plurality of WTRUs. The WTRU may have a processor configured to determine a group identification for the plurality of WTRUs based on the MTC triggering message. The WTRU may have a processor configured to translate the determined group identification for the plurality of WTRUs to a plurality of individual WTRU identifications. This may be done, for example, for a WTRU in the plurality of WTRUs, for each WTRU in the plurality of WTRUs, or the like. The WTRU may have a processor configured to send the MTC triggering message to the one or more WTRUs in the plurality of WTRUs.

A WTRU may have a processor configured to receive an MTC triggering message from a GWTRU. The MTC triggering message may include an action indication. The WTRU may have a processor configured to analyze the MTC triggering message to determine the action indication. The WTRU may have a processor configured to send, based on the determined action indication, a request for data to an AS. The WTRU may have a processor configured to contact the ProSe server or ProSe function. The WTRU may have a processor configured to send a confirmation indication to the GWTRU. The MTC triggering message may be an SMS message. The SMS message may include an information element. The information element may include an indication that the SMS message is applicable to the plurality of WTRUs.

A WTRU may have a processor configured to receive a triggering message from a server. The server may be an application server or a proximity service (ProSe) function. The triggering message may comprise an indication to initiate an action. The action may comprise transmission over a direct link. The action may comprise transmission of discovery over a direct link. The WTRU may have a processor configured to send a response message to the server. The response message may indicate the receipt of the triggering message. The WTRU may have a processor configured to initiate, based on the triggering message, the action. The WTRU may have a processor configured to initiate transmission of discovery over the direct link based, for example, on at least one preconfigured ProSe parameter.

A WTRU may have a processor configured to receive a triggering message from a proximity service (ProSe) function. The triggering message may comprise an indication to initiate discovery over a PC5 reference point. The WTRU may have a processor configured to send a response message to the ProSe function. The response message may indicate the receipt of the triggering message. The WTRU may have a processor configured to initiate, based on the triggering message, discovery over the PC5 reference point. The WTRU may have a processor configured to initiate discovery over the PC5 reference point based on at least one preconfigured ProSe parameter.

An MTC inter-working function (IWF) may comprise a processor and a memory. The MTC IWF may comprise a processor configured to receive a MTC triggering message over a Tsp interface from a Service Capability Sever (SCS) or Application Server (AS). The MTC triggering message may be applicable to a group of MTC devices. The MTC IWF may comprise a processor configured to translate a group identification from the MTC triggering message to a plurality of WTRU identifications. The MTC IWF may comprise a processor configured to trigger individual SMS messages to each of the WTRU identifications. The MTC IWF may be a mobility management entity. The MTC IWF may comprise a processor configured to send one or more acknowledgements to the SCS/AS indicating which of the plurality UE IDs received the SMS message.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application. The figures may illustrate messaging charts, which are meant to be exemplary. Other embodiments may be used. The order of the communications may be varied where appropriate. A communication may be omitted if not needed, and additional communications may be added.

FIG. 1 is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

Figure 1A:
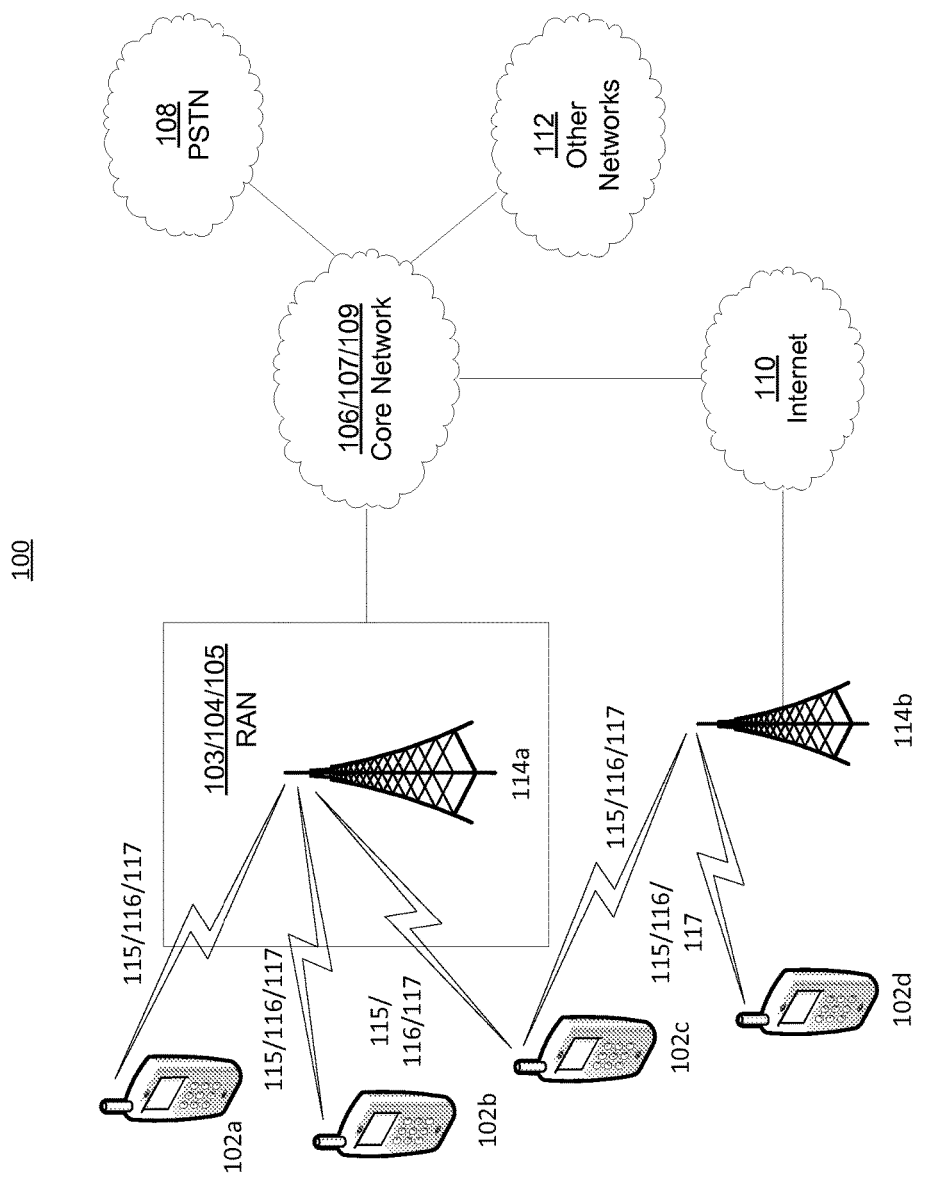
FIG. 1A is a system diagram of an example communications system in which one or more disclosed embodiments may be implemented.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
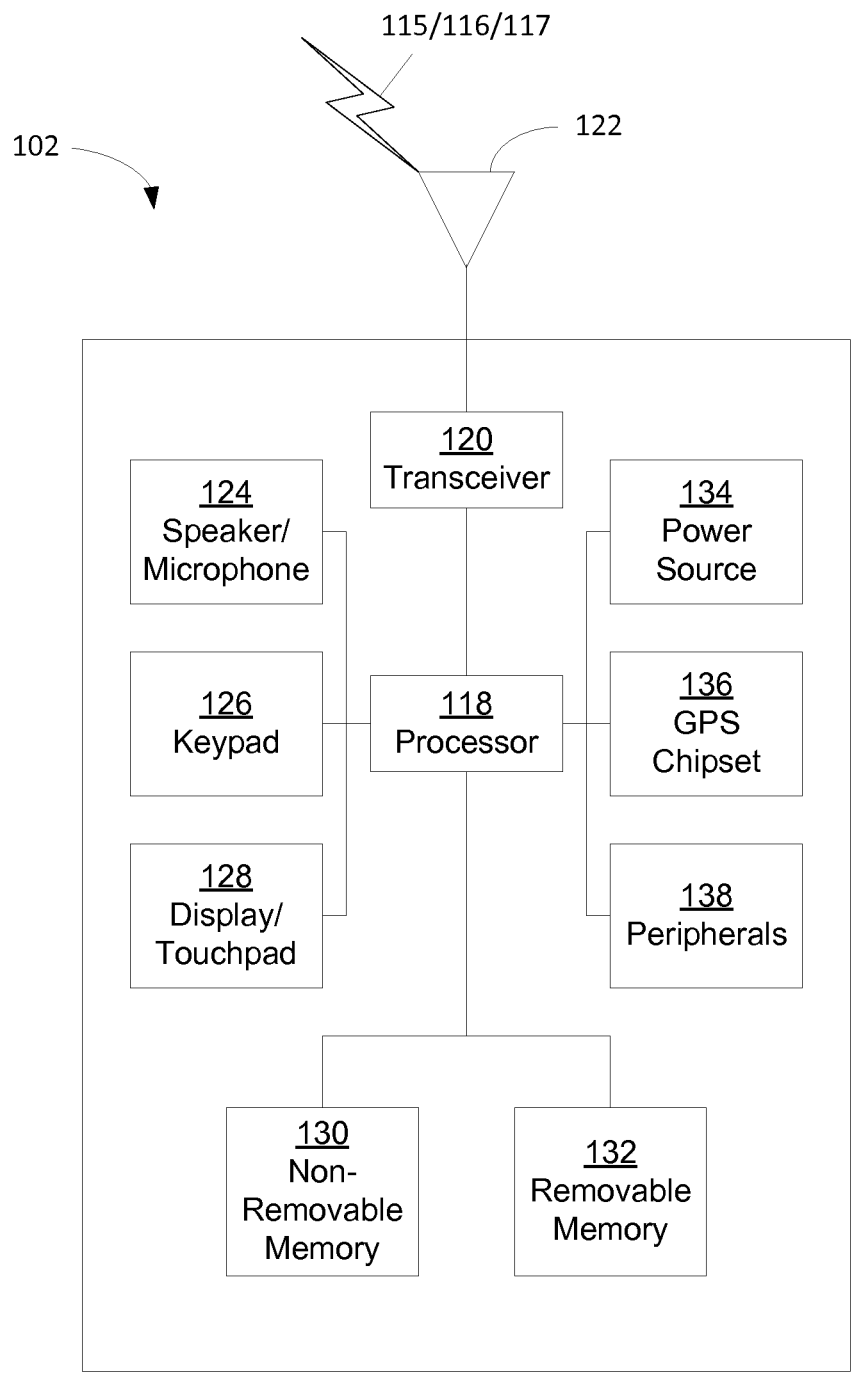
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
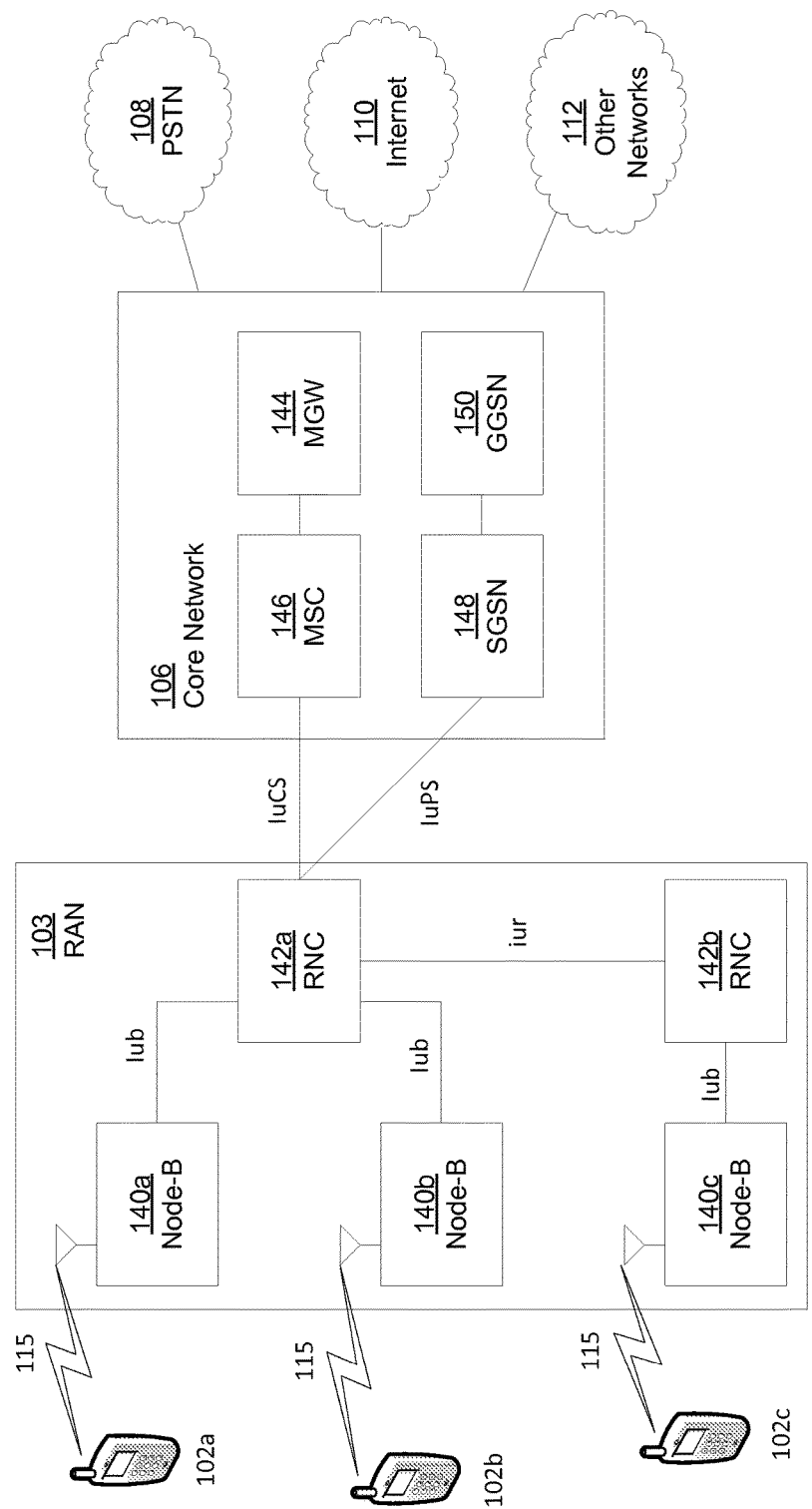
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
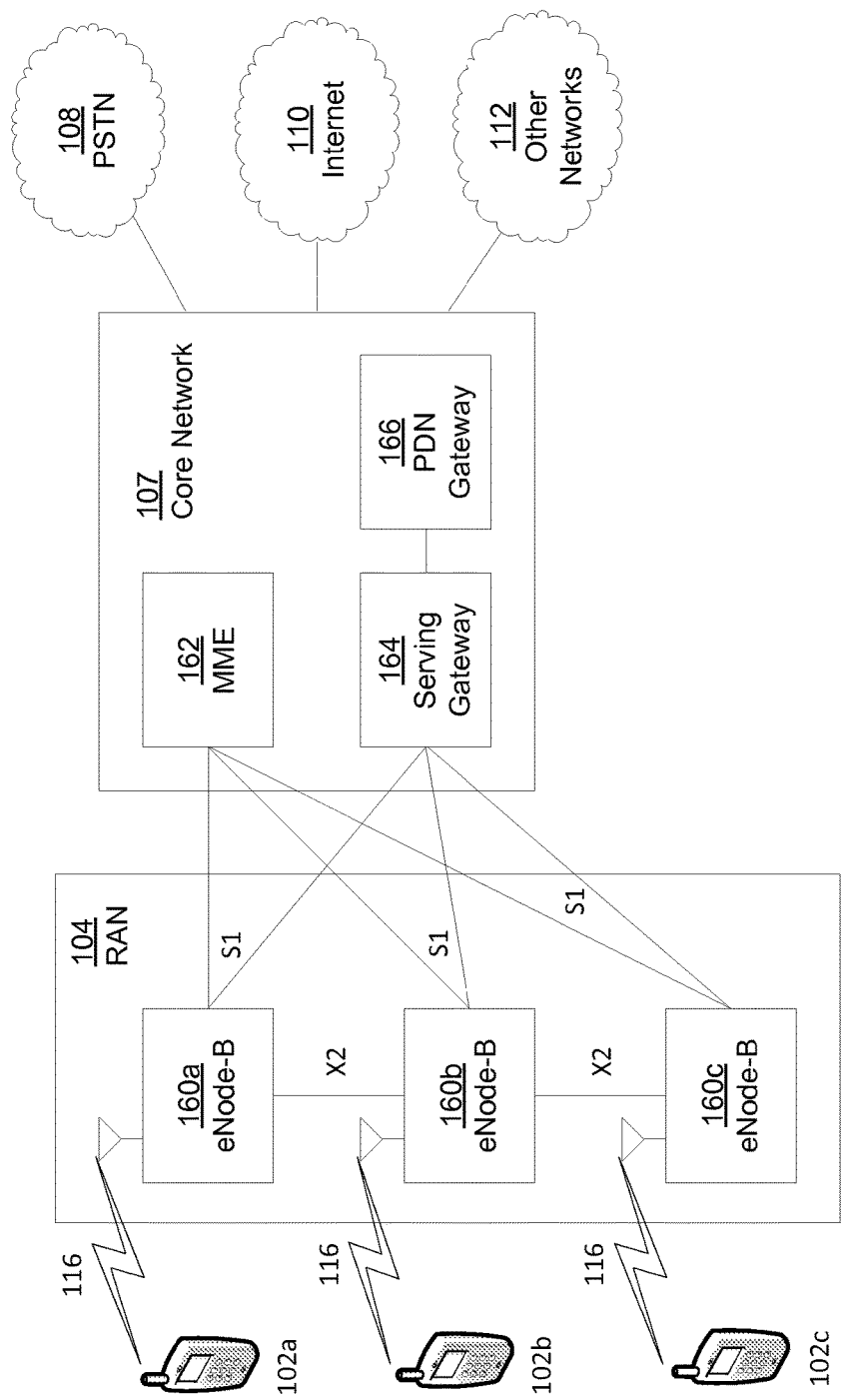
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
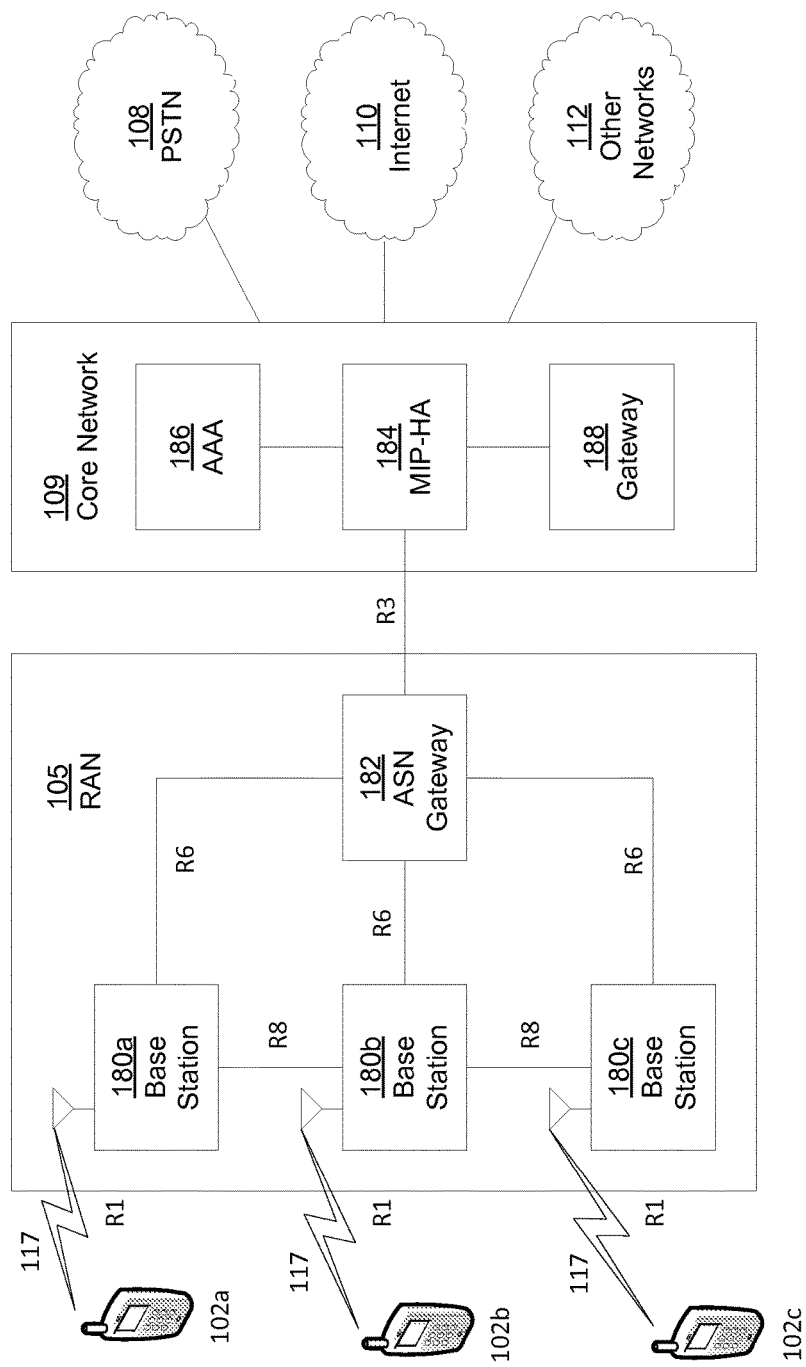
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like.

The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Devices, methods, and systems associated with Machine Type Communication (MTC) group communication, for example in a 3GPP context, may be described. 3GPP systems such as LTE systems (e.g., MME, eNB) may be used to describe examples herein, however the examples apply in other systems and contexts, such as UMTS, GERAN, etc.

A wireless transmit/receive unit (WTRU) may have memory and a processor. For example, the WTRU may have a processor configured to receive a machine-type communication (MTC) triggering message from a service capability server (SCS) or application server (AS). The MTC triggering message may comprise an indication that the MTC triggering message is applicable to a second WTRU. The WTRU may have a processor configured to determine a group identification for the second WTRU based on the MTC triggering message. The WTRU may have a processor configured to translate the determined group identification for the second WTRU to an individual WTRU identification for the second WTRU. The WTRU may have a processor configured to send the MTC triggering message to the second WTRU. The WTRU may have a processor configured to receive a confirmation indication from the second WTRU.

The WTRU may have a processor configured to send, to a mobility management entity (MME), a first non-access spectrum (NAS) message. The first NAS message may indicate that the WTRU is capable of acting as a gateway WTRU (GWTRU). The first NAS message may be an Attach Request message or a Tracking Area Update Request message. The WTRU may have a processor configured to receive, from an evolved NodeB (eNB), a radio resource control (RRC) message. The RRC message may include a GWTRU configuration. The GWTRU configuration may be used to configure the WTRU to act as a GWTRU. The WTRU may have a processor configured to receive, from the MME, a second NAS message. The second NAS message may indicate that the WTRU may act as the GWTRU. The second NAS message may be an Attach Accept message or a Tracking Area Update Accept message. The WTRU may have a processor configured to send, to the MME, a message indicating that the WTRU may stop acting as a GWTRU.

The WTRU may have a processor configured to send, to an evolved NodeB (eNB), a first radio resource control (RRC) message. The first RRC message may indicate that the WTRU may be capable of acting as a gateway WTRU (GWTRU). The WTRU may have a processor configured to receive, from an evolved NodeB (eNB), a second radio resource control (RRC) message. The second RRC message may include a configuration for the WTRU that may allow the WTRU to act as the GWTRU. The WTRU may have a processor configured to send, to the eNB, a message indicating that the WTRU may stop acting as a GWTRU.

The WTRU may have a processor configured to send, to the SCS or AS, an indication that the WTRU is capable of acting as a gateway WTRU (GWTRU). The WTRU may have a processor configured to receive, from a proximity based service (ProSe) server, an indication to act as a GWTRU. The WTRU may have a processor configured to receive, from the SCS or AS, an application layer message. The application layer message may include a configuration for the WTRU that may allow the WTRU to act as a GWTRU.

The MTC triggering message may be an SMS message. The SMS message may include an information element. The information element may include an indication that the SMS message is applicable to the plurality of WTRUs. The information element may be in the transfer protocol (TP) header or the control protocol (CP) header. The MTC triggering message may include an action indication for the WTRU or at least one of the plurality of WTRUs. The action indication may be an instruction for WTRU to initiate contact with the AS, initiate contact with at least one of the plurality of WTRUs over a PC5 reference point, or the like.

The MTC triggering message may comprise an indication that the MTC triggering message is applicable to a plurality of WTRUs. The WTRU may have a processor configured to determine a group identification for the plurality of WTRUs based on the MTC triggering message. The WTRU may have a processor configured to translate the determined group identification for the plurality of WTRUs to a plurality of individual WTRU identifications. This may be done, for example, for a WTRU in the plurality of WTRUs, for each WTRU in the plurality of WTRUs, or the like. The WTRU may have a processor configured to send the MTC triggering message to the one or more WTRUs in the plurality of WTRUs.

A WTRU may have a processor configured to receive an MTC triggering message from a GWTRU. The MTC triggering message may include an action indication. The WTRU may have a processor configured to analyze the MTC triggering message to determine the action indication. The WTRU may have a processor configured to send, based on the determined action indication, a request for data to an AS. The WTRU may have a processor configured to send a confirmation indication to the GWTRU. The MTC triggering message may be an SMS message. The SMS message may include an information element. The information element may include an indication that the SMS message is applicable to the plurality of WTRUs.

A WTRU may have a processor configured to receive a triggering message from a server. The server may be an application server or a proximity service (ProSe) function. The triggering message may comprise an indication to initiate an action. The action may comprise transmission over a direct link. The action may comprise transmission of discovery over a direct link. The WTRU may have a processor configured to send a response message to the server. The response message may indicate the receipt of the triggering message. The WTRU may have a processor configured to initiate, based on the triggering message, the action. The WTRU may have a processor configured to initiate transmission of discovery over the direct link based, for example, on at least one preconfigured ProSe parameter.

A WTRU may have a processor configured to receive a triggering message from a proximity service (ProSe) function. The triggering message may comprise an indication to initiate discovery over a PC5 reference point. The WTRU may have a processor configured to send a response message to the ProSe function. The response message may indicate the receipt of the triggering message. The WTRU may have a processor configured to initiate, based on the triggering message, discovery over the PC5 reference point. The WTRU may have a processor configured to initiate discovery over the PC5 reference point based on at least one preconfigured ProSe parameter.

An MTC inter-working function (IWF) may comprise a processor and a memory. The MTC IWF may comprise a processor configured to receive a MTC triggering message over a Tsp interface from a Service Capability Sever (SCS) or Application Server (AS). The MTC triggering message may be applicable to a group of MTC devices. The MTC IWF may comprise a processor configured to translate a group identification from the MTC triggering message to a plurality of WTRU identifications. The MTC IWF may comprise a processor configured to trigger individual SMS messages to each of the WTRU identifications. The MTC IWF may be a mobility management entity. The MTC IWF may comprise a processor configured to send one or more acknowledgements to the SCS/AS indicating which of the plurality UE IDs received the SMS message.

MTC applications may involve a group of devices. Group based messaging may be used to distribute a message (e.g., a trigger request) to members of an MTC group that may be located in a geographical area on request of the Service Capability Server (SCS). This may be done, for example, to provide an efficiently distribution the message to members of the MTC group.

Figure 2:
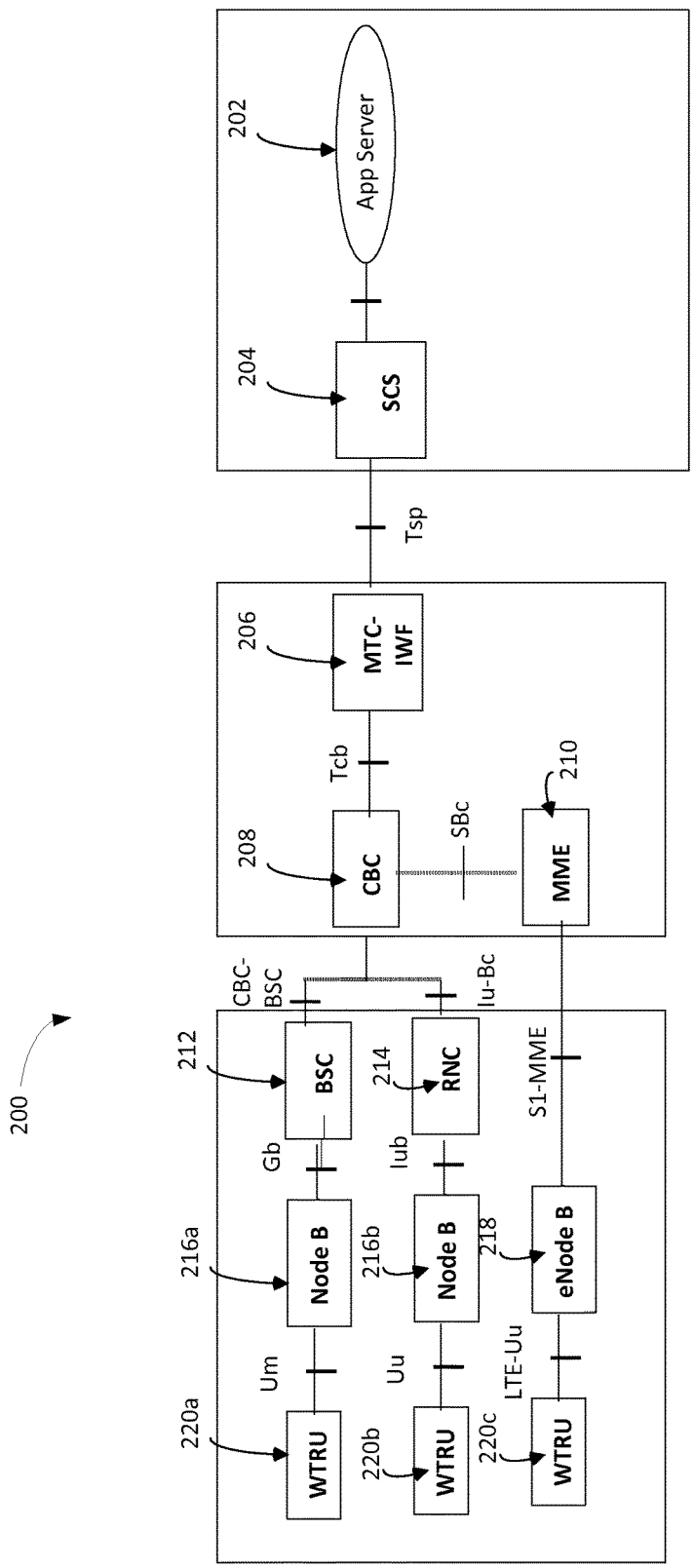
FIG. 2 illustrates an example architecture for group communication with cell broadcast.

FIG. 2 illustrates an example architecture for group communication with cell broadcast 200. Group communication may use cell broadcast. For example, group communication may use a cell broadcast that may enable group triggering and/or communication. Cell broadcast may be used to trigger and/or send a message to a group of MTC devices (e.g., WTRUs), for example, when the geographic area in which the devices are located may be known. Cell broadcast may be used to trigger and/or send a message to a group of MTC devices (e.g., WTRUs), for example, when a subset of devices of an MTC group that are located in a geographic area are to be triggered. In FIG. 2, the application server (AS) 202 may be operably connected to the SCS 204. The SCS 204 may be operably connected to the MTC inter-working function (IWF) 206 via a Tsp interface. A group message may be received by the MTC IWF 206 over the Tsp interface. The group message may comprise a group identification, geographic information, group message information, instructions for the group message recipient, the applicable RATs, the number of times and frequency/rate to broadcast the trigger/message, etc.

In FIG. 2, the MTC IFW 206 may be operably connected to the cell broadcast center (CBC) 208. The CBC 208 may be configured in the MTC IFW 206. The MTC-IWF 206 may set the message identification (ID) information element (IE) a value allocated for the MTC WTRU triggering. The MTC-IWF 206 may provide group identification information in the cell broadcast message body. The MTC IWF 206 may send the group message to the CBC 208.

The CBC 208 may be operably connected to the mobility management entity (MME) 210, the BSC 212, and the RNC 214. The CBC 208 may convey the group message content. The CBC 208 may recognize group trigger and/or message requests. The CBC 208 may assign message identification (ID) information element (IE) to a value allocated for the MTC WTRU triggering.

The MME 210 may be operably connected via the S1-MME interface to eNode B 218, which may be operably connected to WTRU 220c via the LTE-Uu interface. The MME 210 may receive and/or process trigger requests. The MME 210 may forward trigger request or group information to eNB 218. The BSC 212 may be operably connected via the Gb interface to Node B 216a, and the Node B 216a may be operably connected to WTRU 220a via the Um interface. The RNC 214 may be operably connected via the Iub interface to Node B 216b, which may be operably connected to WTRU 220b via the Uu interface. The CBC 208 may use target location/area information to determine a cell broadcast area for the trigger broadcast. The WTRUs 220a/220b/220c to be triggered may listen to the cell broadcast channel that received the group message information from the CBC 208.

Figure 3:
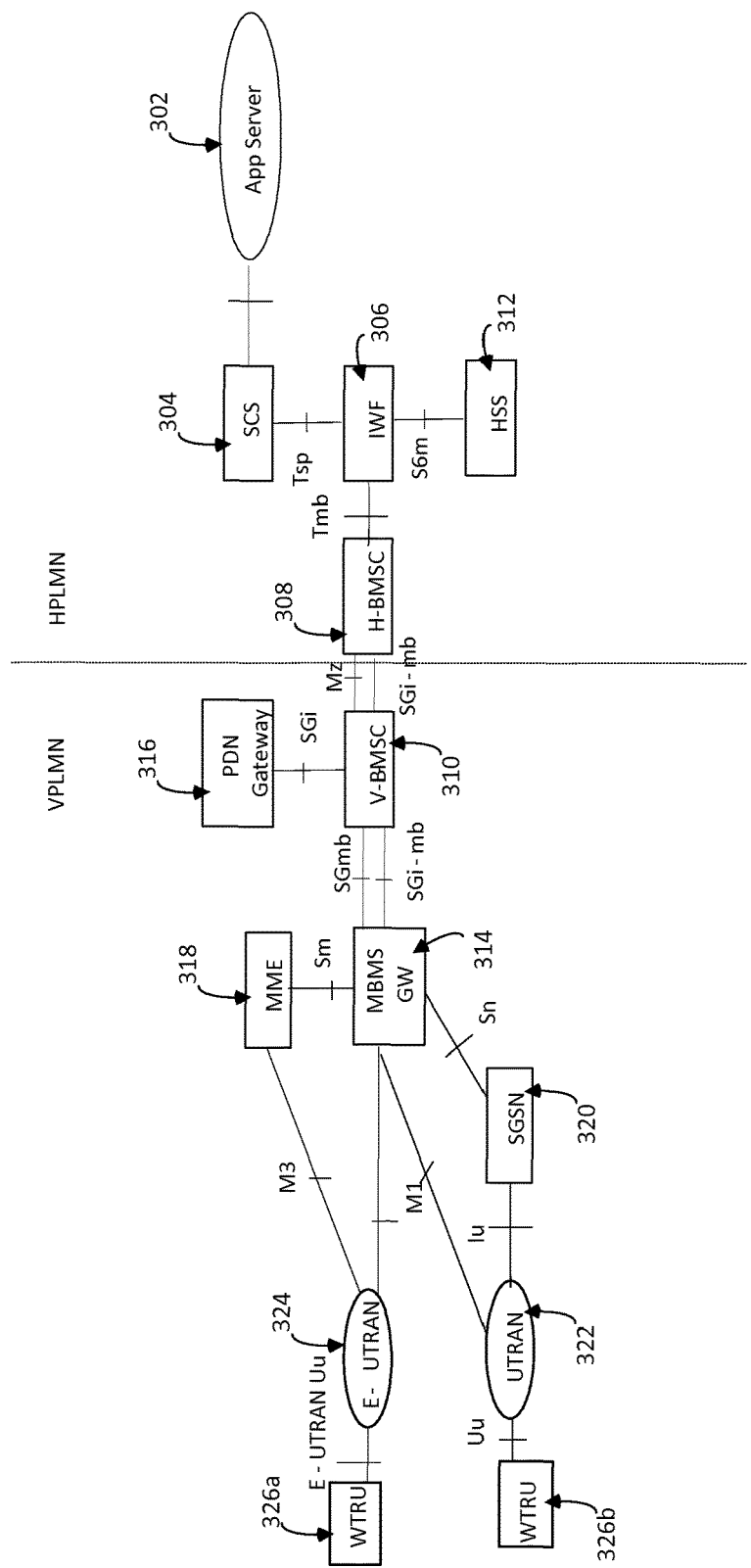
FIG. 3 illustrates an example architecture for group communication with multimedia broadcast multicast service (MBMS).
Figure 4:
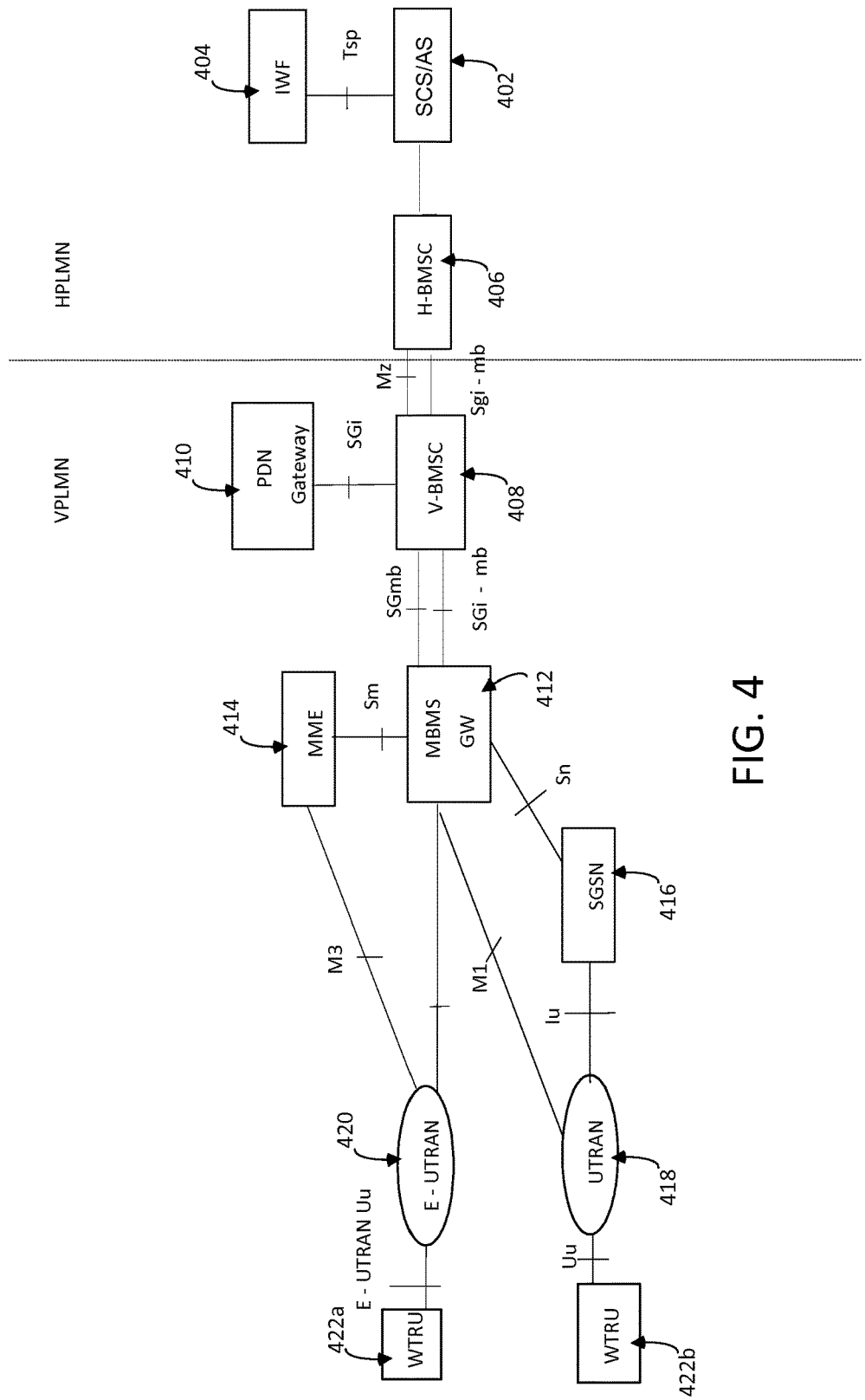
FIG. 4 illustrates an example architecture for group communication with MBMS.

Group communication may use MBMS. Examples of architectures associated with group communication with MBMS are illustrated in FIG. 3 and FIG. 4. FIG. 3 illustrates an example architecture for group communication with MBMS. In FIG. 3, the application server (AS) 302 may be operably connected to the SCS 304. The SCS 304 may be operably connected to the MTC inter-working function (IWF) 306 via a Tsp interface. The MTC-IWF 306 may connect to a broadcast multicast service center (BM-SC), such as in an architecture for group communication with MBMS. In the roaming case, the BM-SC may be the H-BMSC 308 located in HPLMN. The application server 302 may provide the content to be broadcasted and/or additional information to SCS 304. The SCS 304 may forward the content over Tsp to MTC-IWF 306. If the MTC-IWF 306 and BM-SC may not be co-located, an interface Tmb between them may be utilized. The message content may be delivered from H-BM-SC 308 to V-BM-SC 310 using the control plane interface Mz. If MTC-IWF 306 and BM-SC may be co-located, the interface between IWF/BM-SC and MBMS-GW 314 may be based on existing interfaces SGmb and SGi-mb. The V-BMSC 310 may be operably connected to the PDN Gateway 316 via the SGi interface. The MTC-IWF 306 may support group messaging functionality. The MTC-IWF 306 may receive a group messaging request from SCS 304. The MTC-IWF 306 may have the ability to authorize control plane requests from an SCS 304. The MTC-IWF 306 may report to the SCS 304 the acceptance or non-acceptance of the group messaging request. The MTC-IWF 306 may interrogate the appropriate HSS 312, for example, to determine if an SCS 304 may be allowed to send a group messaging request to a particular group. The MTC-IWF 306 may translate protocol of a group messaging request. Translating protocol may be interpreting a protocol for the intended recipient of the protocol. The MTC-IWF 306 may forward protocol of a group messaging request towards the BM-SC/MBMS-GW 314. The MTC-IWF 306 may generate group messaging charging data records (CDR), such as a group External Identifier, aSCS Identifier, etc. The MTC-IWF 306 may forward the group messaging CDRs to charging data function (CDF) or charging gateway function (CGF), for example, over an instance of Rf/Ga. The MTC-IWF 306 may trigger a session start procedure, for example, based on the registered service areas and the RAT(s).

The MBMS-GW 314 may be operably connected to the MME 318 via the Sm interface and/or the SGSN 320 via the Sn interface. The MBMS-GW 314 (e.g., via the M1 interface) and the SGSN 320 (e.g., via the Iu interface) may be operably connected to UTRAN 322. The UTRAN 322 may be operably connected to WTRU 326*b* via the Uu interface. The MBMS-GW 314 (e.g., via the M1 interface) and the MME 318 (e.g., via the M3 interface) may be operably connected to E-UTRAN 324. The E-UTRAN 324 may be operably connected to WTRU 326*a* via the E-UTRAN Uu interface.

FIG. 4 illustrates an example architecture for group communication with MBMS. A Service Capability Server (SCS) 402 may connect to a BM-SC 406, such as in an architecture for group communication with MBMS. In FIG. 4, the MTC-IWF 404 may be inapplicable to group messaging. The Tsp interface may be supported at SCS 402 towards IWF 404 for sending unicast messages, such as point-to-point device trigger requests (e.g., SMS over T4 interface) to individual WTRUs. The SCS 402 may distinguish between whether broadcasting may be performed or whether unicast messages may be sent.

Similar to FIG. 3, in FIG. 4, message content for group communication may be delivered from H-BM-SC 406 to V-BM-SC 408 using the control plane interface Mz. The V-BM-SC 408 may be operably connected to the MBMS-GW 412 via interfaces SGmb and SGi-mb. The V-BMSC 310 may be operably connected to the PDN Gateway 316 via the SGi interface. The MBMS-GW 412 may be operably connected to the MME 414 via the Sm interface and/or the SGSN 416 via the Sn interface. The MBMS-GW 412 (e.g., via the M1 interface) and the SGSN 416 (e.g., via the Iu interface) may be operably connected to UTRAN 418. The UTRAN 418 may be operably connected to WTRU 422*b* via the Uu interface. The MBMS-GW 412 (e.g., via the M1 interface) and the MME 414 (e.g., via the M3 interface) may be operably connected to E-UTRAN 420. The E-UTRAN 420 may be operably connected to WTRU 422*a* via the E-UTRAN Uu interface.

Figure 5:
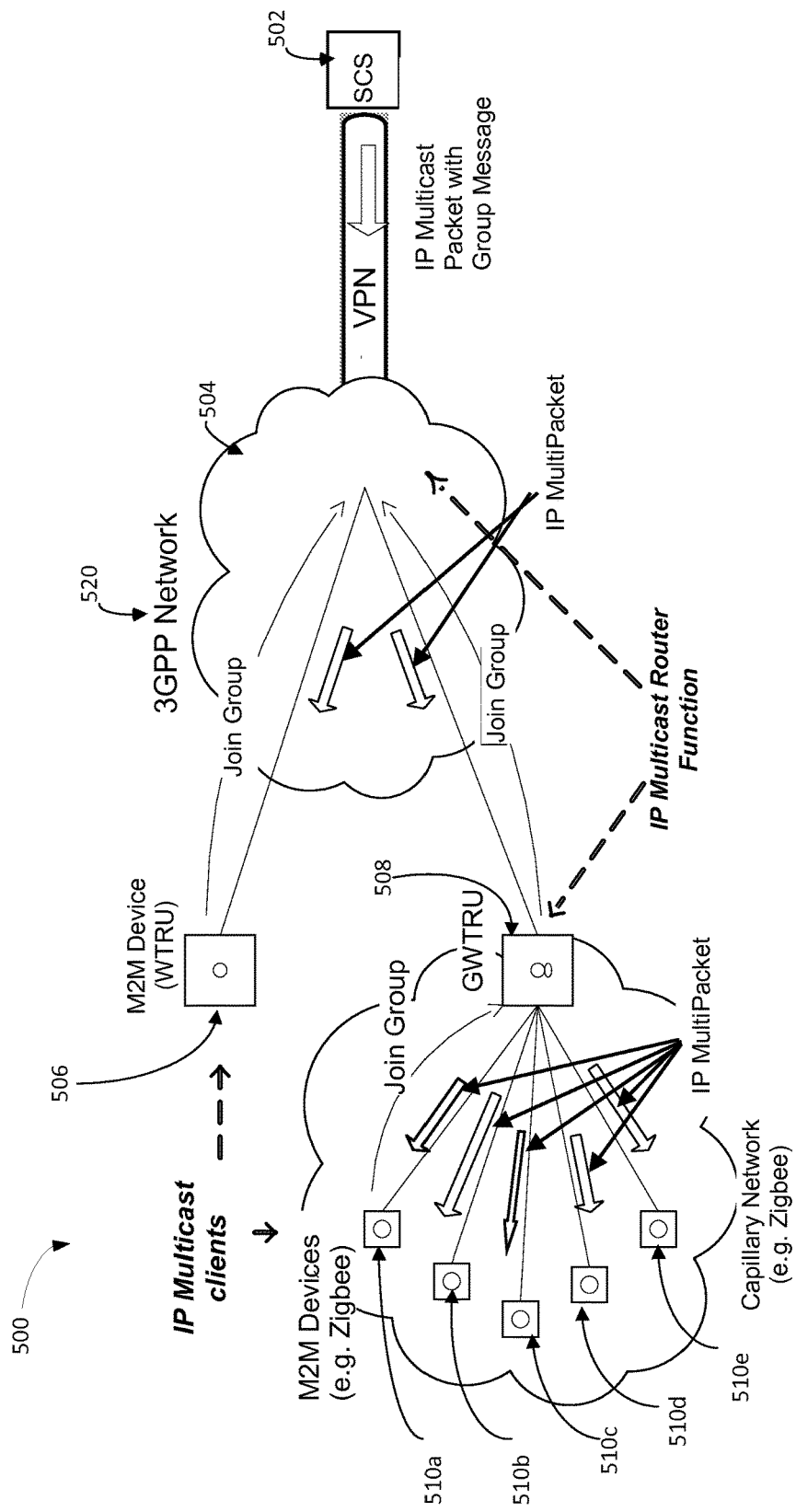
FIG. 5 illustrates an example architecture for group communication using IP Multicast.

FIG. 5 illustrates an example architecture for group communication using IP Multicast, such as IP Multicast 500. Group communication may use IP Multicast. IP multicast may be used to enable group communication. IP Multicast may be used to a send a message to a group of MTC devices. For EPC, an IP multicast router function may be utilized in the P-GW 504. WTRUs may act as gateways WTRUs (GWTRUs) 508. GWTRUs 508 may have IP multicast router functionality, which may allow a capillary network with a multiple of M2M devices 510*a*/510*b*/510*c*/510*d*/510*e* to be controlled behind the GWTRU 508.

Packet Domain may allow access to IP Multicast traffic coming from an external network. The SCS 502 may be assigned a range of multicast addresses to use for group messaging. The GGSN/P-GW 504 may support IGMP (IPv4), MLD (IPv6), and one or more Inter-Router Multicast protocols, such as DVMRP, MOSPF, or PIM-SM. This may be done, for example, to the WTRU 508/506 to subscribe to multicast groups from outside the PLMN using, for example a Packet Core Network (PCN). IGMP/MLD may be utilized in IP Multicast. IGMP/MLD may be used as a Host-Router Multicast protocol. MTC hosts that may wish to receive IP multicasts may implement IGMP (e.g., or equivalent) and class-D IPv4 addresses or MLD and IPv6 multicast. The VPN/Tunnel to secure IP multicast packet (i.e., with MTC Group message) may be from a known source, such as the SCS 502. MTC devices may join towards the multicast addresses corresponding to the MTC groups to which they belong.

To deliver IP-Multicast packets to the appropriate MTC devices the GGSN/P-GW 504 may have an IP-Multicast proxy functionality. The GGSN/P-GW 504 may maintain a list of mobiles that joined one or more Multicast groups. This list may be built and/or updated one or more (e.g., each) time the GGSN/P-GW 504 receives an IGMP Join or MLD Report message from the WTRU. The GGSN/P-GW 504 may send, based on this maintained list of WTRUs, multicast routing information to the routers attached to the Packet Domain, allowing them to route multicast packets. The GGSN/P-GW 504 may, upon reception by the GGSN/P-GW 504 of multicast packets (e.g., that may be carrying a MTC group message), make and/or send a copy as Point-to-Point packets, to one or more WTRU of the MTC group.

IP-Multicast traffic may be handled after a WTRU has attached to the Packet Domain, and a bearer (e.g., Activated PDP context(s), authentication, etc.) may point to the preferred ISP/external network. Dedicated APN for MTC purposes may be used with a dedicated tunnel towards the SCS 502. The SCS 502 may issue MTC Group Messages towards specific groups via specific multicast addresses. The GGSN/P-GW 504, in particular for large groups, may distribute the group message towards the WTRUs 506/508 in a rate limiting manner (e.g., limit to X packets per second, or Y packets per SGW per second, etc.). This may avoid the multicast messages overloading the network and the SCS 502 being overloaded. The Multicast traffic may be handled at the application level from a Packet Domain perspective and may be sent over UDP/IP.

Proximity based Service (ProSe) may relate to the use of direct communication between WTRUs. The direct communication between WTRUs may use a broadcast mode over the air. A broadcast message may include an IP layer packet. A layer 2 frame may comprise information indicating a source of transmission. A layer 2 frame may comprise information indicating a destination group (e.g., to which a message may pertain).

Figure 6:
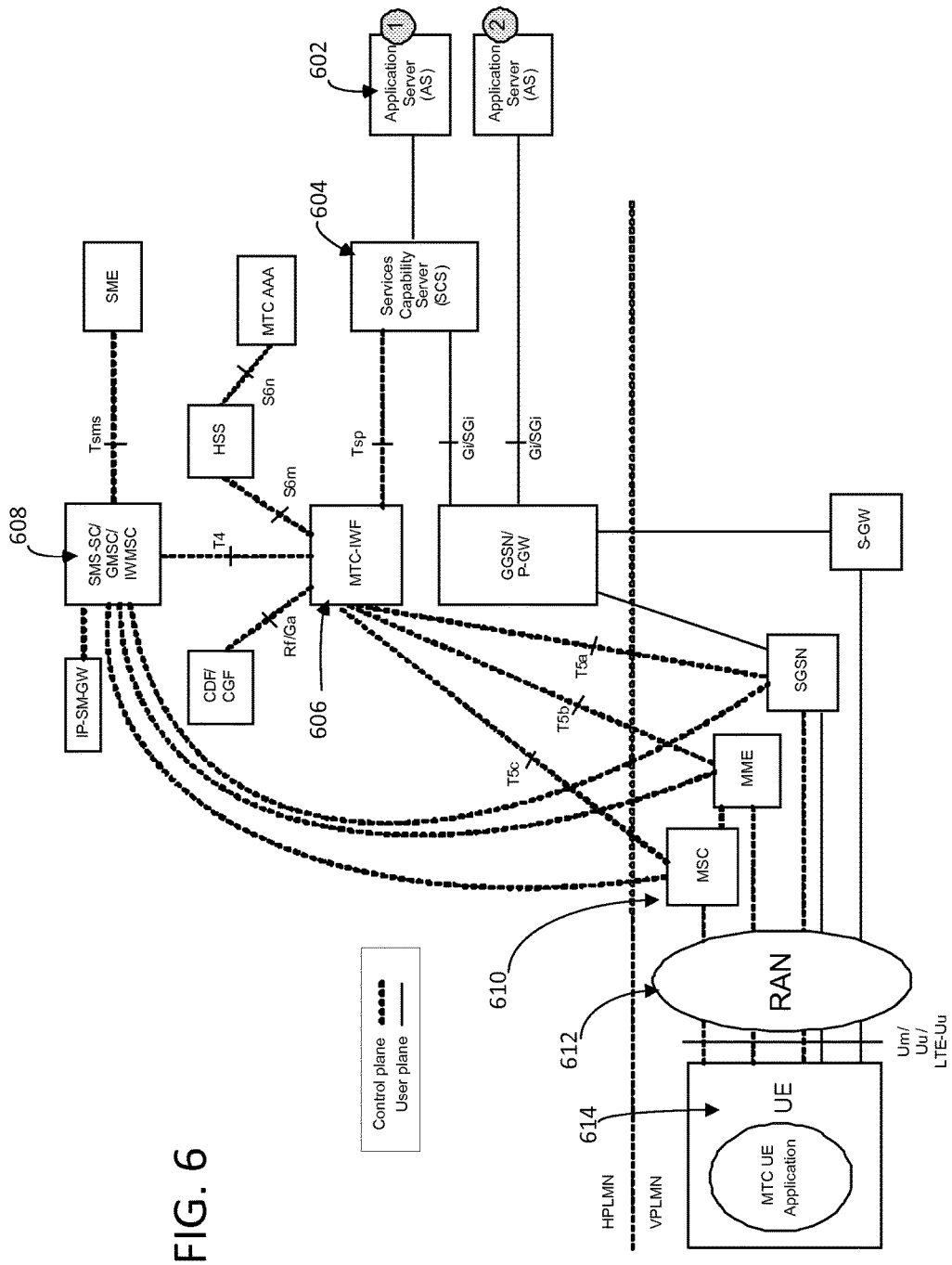
FIG. 6 illustrates an exemplary MTC architecture.

A WTRU may be may be triggered, for example in a 3GPP context. FIG. 6 illustrates an exemplary MTC architecture. FIG. 6 may illustrate the pathway to trigger a WTRU. For example, the application server 602 may determine that a WTRU 614 may be triggered. The application server 602 may determine that a WTRU 614 may be triggered, for example, based on application logic. The application server (AS) 602 may send an indication to trigger the WTRU 614 the SCS 604. The SCS 604 may send the indication to trigger the WTRU 614 to the MTC-IWF 606 via the Tsp interface. The MTC-IWF 606 may authorize the triggering of the WTRI 614 and may forward the indication to trigger the WTRU 614 to the short message service center (SMS-SC), the gateway mobile service switching center (GMSC), and the Inter-working mobile service switching center (IWMSC) 608 via the T4 interface. The SMS-SC/GMSC/IWMSC 608 may send the indication to trigger the WTRU 614 to the MSC 610. The MSC 610 may send the indication to trigger the WTRU 614 over the RAN 612 to the WTRU 614. The WTRU 614 may receive the indication to trigger the WTRU 614. The WTRU 614 may have memory and a processor. For example, the WTRU may have a processor configured to receive an MTC triggering message from the SCS 604 or AS 602. The triggering message may include an indication that the MTC triggering message is applicable to a second WTRU. The WTRU may have a processor configured to determine a group identification for the second WTRU based on the MTC triggering message. The WTRU may have a processor configured to translate the determined group identification for the second WTRU to an individual WTRU identification for the second WTRU. The WTRU may have a processor configured to send the MTC triggering message to the second WTRU. The WTRU may have a processor configured to receive a confirmation indication from the second WTRU.

Figure 7:
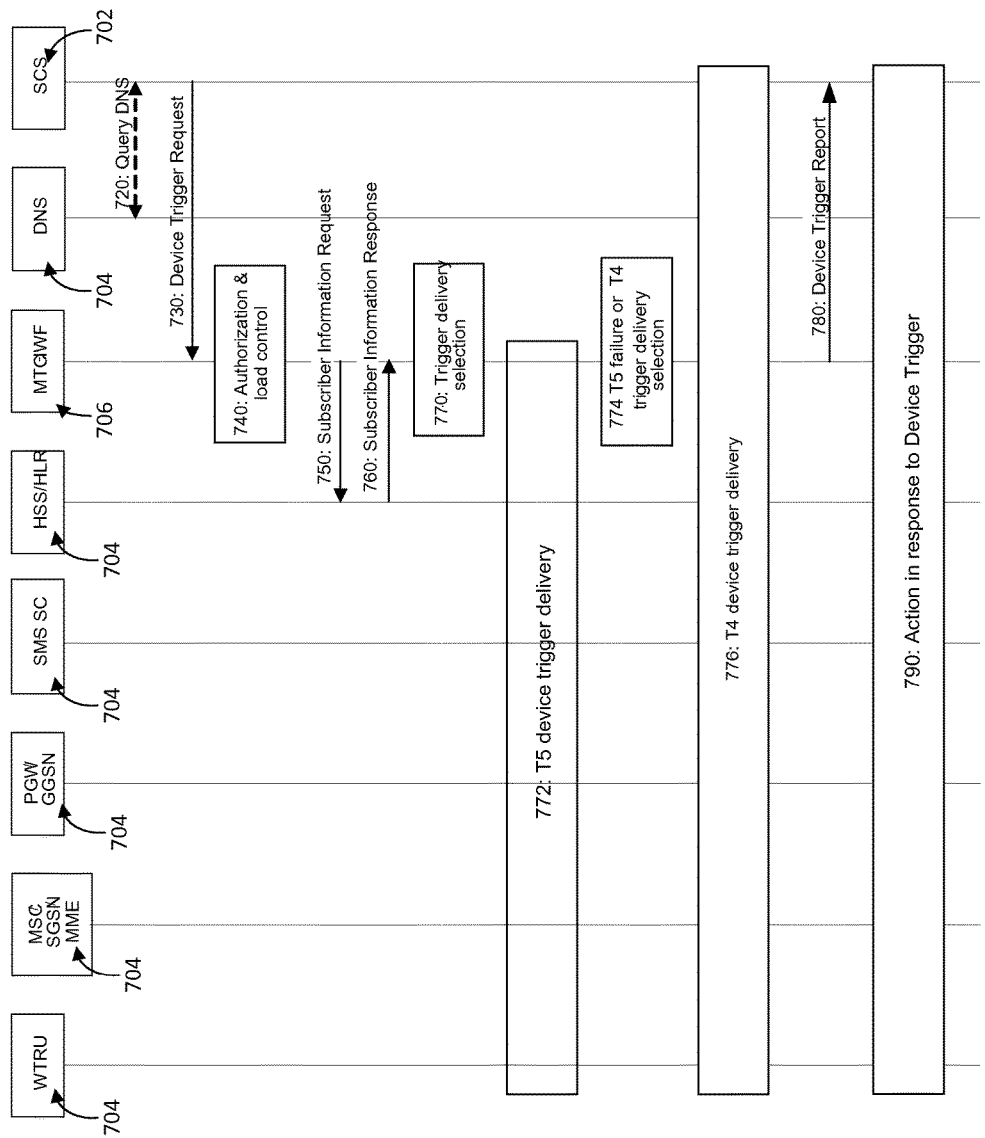
FIG. 7 is an example of messaging signaling associated with submitting a trigger to a WTRU.

FIG. 7 is an example of messaging signaling associated with submitting a trigger to a WTRU. In FIG. 7, at 720, the SCS 702 may send a query to the domain name service (DNS) 704. The DNS 704 may receive the query from the SCS 702. At 730, the SCS 702 may send a device trigger request to the MTC-IWF 706. The MTC-IWF 706 may receive the trigger request from the SCS 702. At 740, the MTC-IWF 706 may authorize the device trigger request and may conduct load control. The MTC-IWF 706 may send a subscriber information request at 750 to the home subscriber server (HSS)/home location register (HLR) 708. The HSS/HLR 708 may receive the subscriber information request, and the HSS/HLR 708 may send a subscriber information response at 760 to the MTC-IWF 706. At 770, the MTC-IWF 706 may trigger delivery selection. For example, at 772, the MTC-IWF 706 may conduct T5 device trigger delivery (see, e.g., FIG. 6). If T5 device trigger delivery fails, at 774 the MTC-IWF 706 at 780 may conduct T4 delivery selection (see, e.g., FIG. 8). For example, at 776, the MTC-IWF 706 may conduct T4 device trigger delivery (see, e.g., FIG. 8). At 780, the MTC-IWF 706 may send a device trigger report to the SCS 702. At 790, a WTRU may take an action in response to the device trigger.

Figure 8:
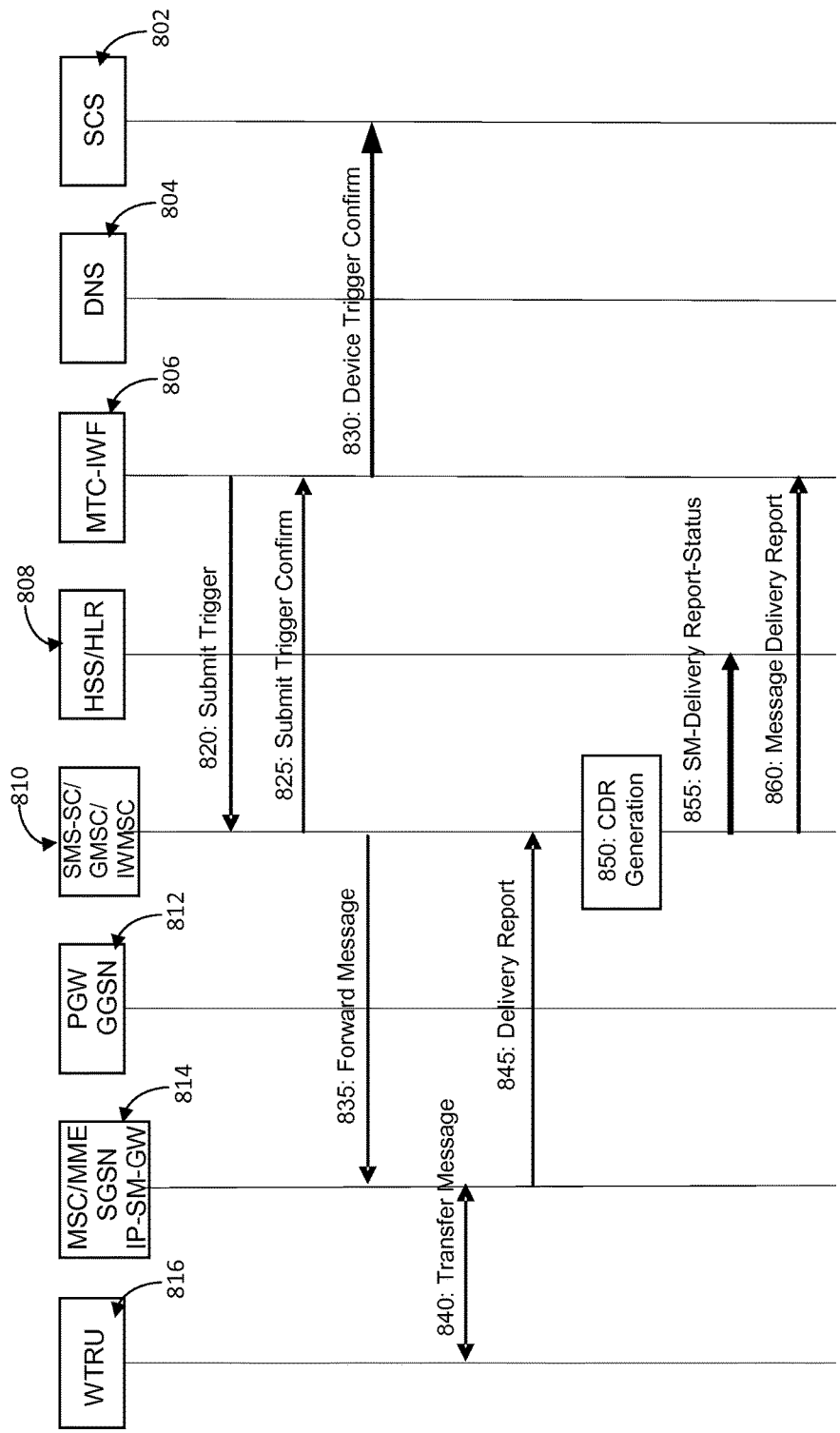
FIG. 8 is an example of a messaging chart associated with sending a trigger to a WTRU via a T4 interface.

FIG. 8 is an example of a messaging chart associated with sending a trigger to a WTRU via a T4 interface. In FIG. 8, at 820, the MTC-IFW 806 may submit a trigger to the SMS-SC/GMSC/IWMSC 810. The SMS-SC/GMSC/IWMSC 810 may receive the trigger. At 825, the SMS-SC/GMSC/IWMSC 810 may submit a trigger confirmation message to the MTC-IWF 806. The MTC-IWF 806 may receive the trigger confirmation message. At 830, the MTC-IWF 806 may send a device trigger confirmation message to the SCS 802. The SCS 802 may receive the device trigger confirmation message. At 835, the SMS-SC/GMSC/IWMSC 810 may forward the trigger message to the MSC/MME Serving GPRS Support Node (SGSN) IP-Short-Message-Gateway (IP-SM-GW) 814. The MSC/MME SGSN IP-SM-GW 814 may receive the trigger message. The trigger message may be transferred between the WTRU 816 and the MSC/MME SGSN IP-SM-GW 814 at 840. The MSC/MME SGSN IP-SM-GW 814 may send a delivery report to the SMS-SC/GMSC/IWMSC 810 at 845. The SMS-SC/GMSC/IWMSC 810 may receive the delivery report. At 850, the SMS-SC/GMSC/IWMSC 810 may generate a CDR. The SMS-SC/GMSC/IWMSC 810 may send an SM-Delivery Report-Status indication to the HSS/HLR 808 at 855. The SMS-SC/GMSC/IWMSC 810 may send a message delivery report to the MTC-IWF 806 at 860.

A trigger may be an SMS message. An SMS message may include information (e.g., information associated with the application for which the trigger may be sent). A WTRU may establish an IP connection with an MTC server and/or application. For example, a WTRU may establish an IP connection with an MTC server and/or application to follow up with any communication for which the trigger may have been sent. A WTRU may determine the purpose of an SMS. For example, a WTRU may determine that an SMS is for triggering, for example by checking the TP-Protocol Identifier IE.

An SMS may be used to trigger a WTRU. An SMS may be able to make a WTRU reachable when a WTRU may not have been available (e.g., a Service Capability Server (SCS) and/or an Application Server (AS) may not know the IP address of a WTRU). An SMS may be used to trigger a group of WTRUs. An SMS may be able to make a group of WTRUs reachable when a group of WTRUs may have been unavailable. Using SMS for triggering may use an SMS per device. For example, a large group of WTRUs may use a large number of SMSs sent, which may generate large amounts of signaling at a system level (e.g., at the Tsp interface, T4 interfaces, in the core network (CN), RAN interfaces, etc.). Group triggering may be used to reduce signaling, for example, by reducing signaling that may be associated with one or more MTC architecture interfaces.

Figure 9:
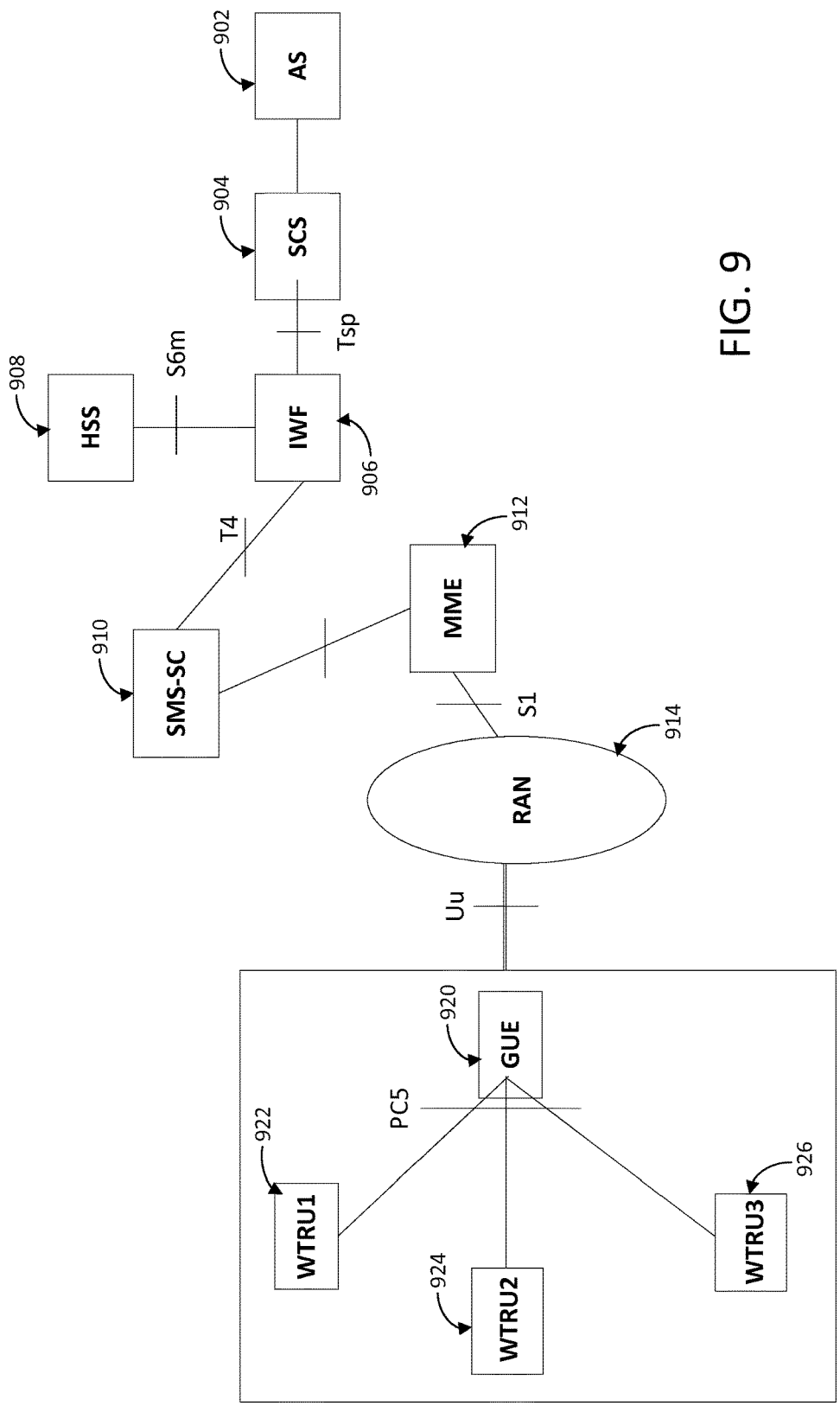
FIG. 9 is an example architecture for efficient group triggering.

FIG. 9 is an example architecture for efficient group triggering. Group triggering may use SMS and ProSe (e.g., direct one-to-many communication, such as over PC5). In FIG. 9, the AS 902 may be operably connected to the SCS 904. The SCS 904 may be operably connected, via the Tsp interface, to the IWF 906. The IWF 906 may be operably connected to the HSS 908 via the S6m interface. The IWF 906 may also be connected to the SMS-SC 910 via the T4 interface. The SMS-SC 910 may be operably connected to the MME 912. The MME 912 may be operably connected, via the S1 interface, to the RAN 914. The RAN 914 may be operably connected, via the Uu interface, to WTRUs 920, 922, 924, 926.

A WTRU may be a Gateway WTRU (GWTRU). A Gateway WTRU 920 may receive a trigger (e.g., an SMS), for example, from the AS 902. A Gateway WTRU 920 may interpret a trigger message. The RAN 914 may be operably connected, via the Uu interface, to a Gateway WTRU (GWTRU) 920. The GWTRU 920 may be operably connected to WTRU1 922, WTRU2 924, and WTRU3 926, via the PC5 interface. The GWTRU 920 may trigger other WTRUs (e.g., WTRU1 922, WTRU2 924, WTRU3 926), for example, the GWTRU 920 may trigger the other WTRUs 922, 924, 926 in response to receiving and/or interpreting a trigger message. A Gateway WTRU 920 may trigger a WTRU based on information, such as a reserved value that may be included in the trigger (e.g., an SMS header, an information element (IE), and/or information in SMS content). A Gateway WTRU 920 may trigger other WTRUs (e.g., WTRU1 922, WTRU2 924, WTRU3 926). For example, a Gateway WTRU 920 may trigger other WTRUs using ProSe, such as direct one-to-many communications. The GWTRU 920 may trigger other WTRUs using ProSe, such as over PC5. A GWTRU 920 may receive a trigger (e.g., an SMS), for example, from the AS 902. A GWTRU 920 may trigger other WTRUs (e.g., sending an IP packet over PC5), for example, with triggering information. For example, a GWTRU 920 may send an SMS over PC5 reference point. A WTRU (e.g., WTRU1 922, WTRU2 924, WTRU3 926) triggered by the GWTRU 920 may contact AS 902. The WTRU (e.g., WTRU1 922, WTRU2 924, WTRU3 926) may contact AS 902 in response to receiving and/or interpreting a trigger from the GWTRU 920. For example, a WTRU (e.g., WTRU1 922, WTRU2 924, WTRU3 926) may contact AS 902 when the WTRU (e.g., WTRU1 922, WTRU2 924, WTRU3 926) receives a trigger over PC5 (e.g., IP or SMS). The WTRU (e.g., WTRU1 922, WTRU2 924, WTRU3 926) may establish an IP connection. The WTRU (e.g., WTRU1 922, WTRU2 924, WTRU3 926) may establish an IP connection, for example, when a GWTRU 920 receives a trigger (e.g., IP or SMS), such as over PC5, and/or contacts the AS 902.

An SMS may be used to indicate group trigger. If an SMS trigger is used, an indication may be provided to a receiving WTRU that a message is for group triggering. An information element (IE) may be used in an SMS message (e.g., as part of the TP header, CP header, another header, and/or the like), for example, to provide the indication. A value for an IE may be used (e.g., a value may be used for a TP-Protocol-Identity to indicate that a message is for group trigger).

A WTRU may be configured to act as a GWTRU (e.g., using NAS and/or RRC messages, etc.). A network may inform a WTRU to act as a GWTRU in a NAS message (e.g., Attach Accept, Tracking Area Update (TAU) Accept, etc.). A network may inform a WTRU to act as a GWTRU in an RRC message (e.g., RRCConnectionReconfiguration). An IE may be included. A value for an IE may indicate that the WTRU act as a GWTRU. A WTRU may act as a GWTRU when it is so configured or when it receives an indication to do so. An indication may be based one or more of the features described herein. For example, an indication may be provided in a broadcast message (e.g., RRC system information broadcast messages). A WTRU may be configured to act as a GWTRU by a ProSe function (e.g., over PC3 reference point or IP interface), or the like. A WTRU may be configured to act as a GWTRU by an AS, or the like.

Figure 10:
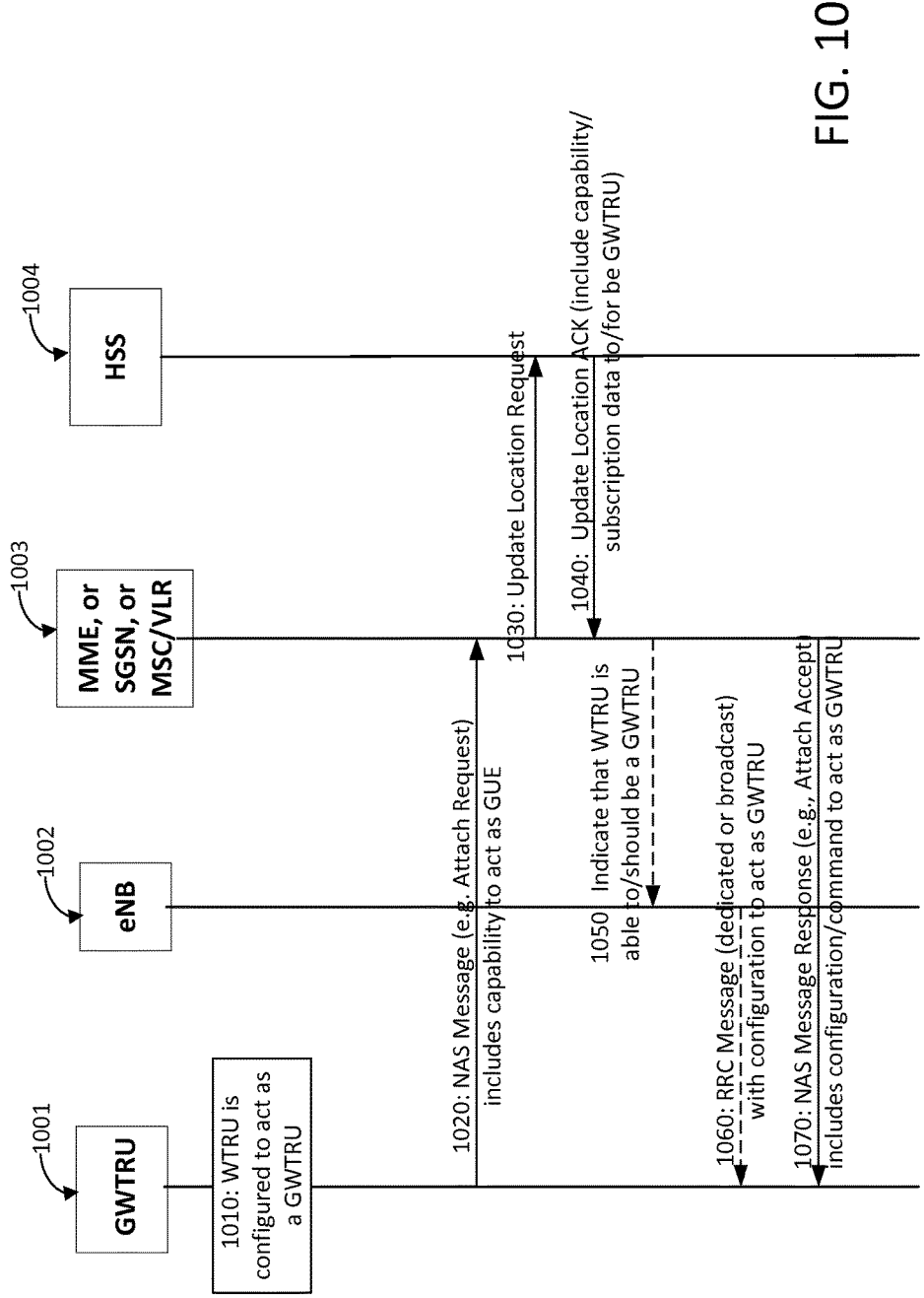
FIG. 10 illustrates an example messaging chart for a WTRU to inform a network component that it is configured to act as a GWTRU.
Figure 11:
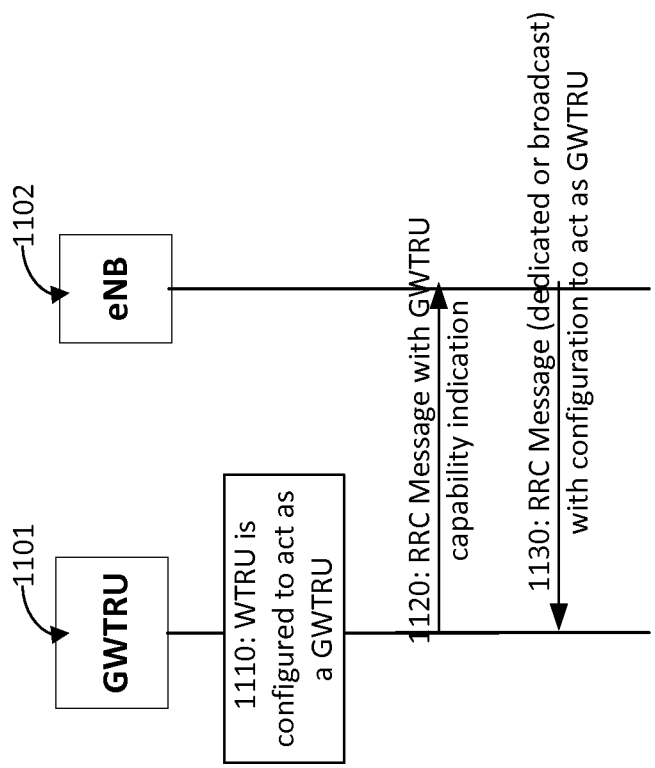
FIG. 11 illustrates an example messaging chart for a WTRU to indicate to a RAN and/or eNB that the WTRU is capable of acting as a GWTRU.
Figure 12:
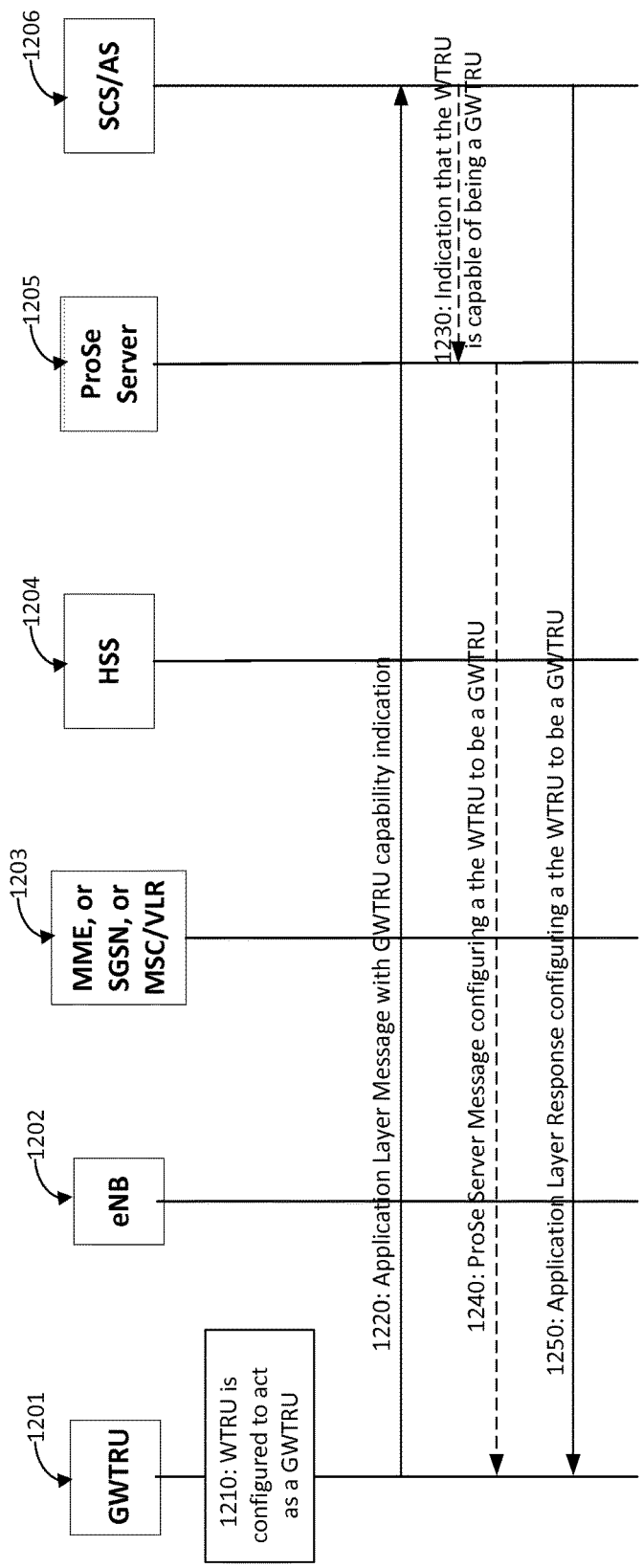
FIG. 12 illustrates an example messaging chart for a WTRU to indicate to an SCS/AS 1206 that it is capable of acting as a GWTRU.

If a WTRU is configured to act as a GWTRU, the WTRU may inform a network component of such configuration. FIGS. 10-12 illustrate example messaging charts for a WTRU to inform a network component that it is configured to act as a GWTRU. A WTRU may send information (e.g., capability and/or configuration information) to a network indicating that the WTRU is configured to operate as a GWTRU. Sending the information indicating that the WTRU is configured to operate as a GWTRU may be implemented by sending a message (e.g., a NAS message or a RRC message). A WTRU may inform an AS that it may be capable to act as a GWTRU. An AS may provide an indication to a network of the WTRU's capability to act as a GWTRU (e.g., via existing interfaces and/or over the PC2 interface that connects the AS and a ProSe function).

LTE systems (e.g. MME, eNB) may be used to describe examples herein, however the examples apply in other systems, such as UMTS, GERAN, etc, and for other nodes such as SGSN, MSC/VLR, RNC having similar functions to counterparts in LTE or EPS.

FIG. 10 illustrates an example messaging chart for a WTRU to inform a network component that it is configured to act as a GWTRU, wherein the WTRU may indicate to the core network that it is capable to act as a GWTRU and the WTRU may obtain a configuration to act as a GWTRU. At 1010, a WTRU 1001 may be capable and/or configured to act at a GWTRU. For example, a WTRU may be preconfigured to act as a GWTRU, may be configured to act as a GWTRU by a user, may receive configuration upon system or network registration, may receive protocols to act as a GWTRU (e.g., Open Mobile Alliance Device Management), etc. The WTRU 1001 may be configured to indicate its capability to act as a GWTRU. At 1020, the WTRU 1001 may send an NAS message to the network (e.g., core network node such as an MME 1003). The NAS message may indicate the WTRU's 1001 ability to act as a GWTRU 1001. The NAS message may be any message, such as Attach Request, a Tracking Area Update (TAU) Request, or any other NAS message. The MME 1003 may receive the NAS message from the WTRU 1001. At 1030, the MME 1003 may fetch the WTRU 1001 context from the HSS 1004. At 1040, the HSS 1004 may provide the MME 1003 with subscription information for this WTRU 1001. The subscription information may include an indication that the WTRU 1001 is capable of acting as a GWTRU 1001 or that the WTRU 1001 may be allowed to act as a GWTRU 1001. The MME 1003 may receive the subscription information from the HSS 1004. Subscription information may be downloaded to a serving CN node (e.g., MME, SGSN, MSC/VLR), for example, when the CN node fetches the context from an HSS 1004, or when the HSS pushes a context update (e.g., new context update) to the CN node. The CN node may forward a configuration to a WTRU 1001, for example, using the one or more of the features described herein (e.g., NAS messages). A CN node may forward information to a RAN node (e.g., eNB 1002), for example, to indicate a WTRU may act as a GWTRU. The eNB 1002, and/or the like, may forward the information (e.g., indication, configuration) to the GWTRU 1001 using messages, such as RRC messages and/or the like. The eNB 1002 may send an RCC message to the GWTRU 1001. The RCC message may include a GWTRU configuration. The GWTRU configuration may be a configuration for the WTRU to act as the GWTRU. The GWTRU 1001 may receive the RCC message from the eNB 1002.

At 1050, the MME 1003 may forward an indication to the eNB 1002, such as the subscription information that it may have received from the HSS 1004. The indication may specify that the WTRU 1001 is capable of being of a GWTRU 1001 or that the WTRU 1001 may be allowed to act as a GWTRU 1001. The eNB 1002 may receive the indication and/or subscription information from the MME 1003. At 1060, the eNB 1002 may forward a configuration to the WTRU 1001 to act as a GWTRU. The eNB 1002 may send the configuration information via a dedicated RRC message or a broadcast RRC message. The WTRU 1001 may receive the configuration information. The WTRU 1001 may begin acting like a GWTRU. At 1070, the MME 1003 may also respond to the WTRU 1001 from 1020 with an NAS message, such as an Attach Accept or TAU Accept, with an indication or configuration that the WTRU 1001 may act as a GWTRU. The WTRU 1001 may receive the configuration information. The WTRU 1001 may begin acting like a GWTRU.

FIG. 11 illustrates an example messaging chart for a WTRU to indicate to a RAN and/or eNB that the WTRU is capable of acting as a GWTRU and/or may obtain a configuration to act as a GWTRU. At 1110, a WTRU 1101 may be capable and/or configured to act at a GWTRU. For example, a WTRU may be preconfigured to act as a GWTRU, may be configured to act as a GWTRU by a user, may receive configuration upon system or network registration, may receive protocols to act as a GWTRU (e.g., Open Mobile Alliance Device Management), etc. At 1120, the WTRU 1101 may send an RRC message to the network (e.g., eNB 1102) in which it indicates its ability to act as a GWTRU. The eNB 1102 may receive the RCC message from the WTRU 1101. At 1130, the eNB 1103 may forward a configuration to the WTRU 1101 to act as a GWTRU. The eNB 1103 may send the configuration via a dedicated RRC message or a broadcast RRC message. The WTRU 1101 may receive the configuration. The WTRU 1101 may begin acting like a GWTRU.

FIG. 12 illustrates an example messaging chart for a WTRU to indicate to an SCS/AS 1206 that it is capable of acting as a GWTRU. In FIG. 12, the SCS/AS 1206 may inform a ProSe server 1205 that the WTRU 1201 is capable of acting as a GWTRU and the SCS/AS 1206 or the ProSe server 1205 may configure the WTRU 1201 to act as a GWTRU. Specifically, at 1210, a WTRU 1201 may be capable and/or configured to act at a GWTRU. For example, a WTRU may be preconfigured to act as a GWTRU, may be configured to act as a GWTRU by a user, may receive configuration upon system or network registration, may receive protocols to act as a GWTRU (e.g., Open Mobile Alliance Device Management), etc. At 1220, the WTRU 1201 may send an indication to the SCS/AS 1206 that it is capable to act as a GWTRU or that the WTRU 1201 may be capable of being configured, or is configured, to act as a GWTRU. The SCS/AS 1206 may receive the indication from the WTRU 1201. At 1230, the SCS/AS 1206 may indicate to the ProSe Server 1205 (e.g., over the PC2 interface) that the WTRU 1201 may be capable of being a GWTRU. The ProSe server 1205 may receive the indication from the SCS/AS 1206. At 1240, the ProSe server 1205 may send a message (e.g., over PC3 or IP interface) to the WTRU 1201 to configure the WTRU 1201 to act as a GWTRU. The WTRU 1201 may receive the message from the ProSe server 1205. At 1250, the SCS/AS 1206 may respond to and/or send an application layer message to the WTRU 1201 to configure the WTRU 1201 to act as a GWTRU. The WTRU 1201 may receive the message from the SCS/AS 1206. The WTRU 1201 may begin acting like a GWTRU.

One or more of the features described herein to configure a WTRU to start acting as a WTRU may be used to configure a WTRU to stop acting as a GWTRU. For example, a GWTRU may send a message to an MME indicating that the GWTRU may stop acting as a GWTRU and start acting as a WTRU. A GWTRU may send a message to an aNB indicating that the GWTRU may stop acting as a GWTRU and start acting as a WTRU. One or more of the features described herein to configure a WTRU to stop acting as a GWTRU may be used to configure a WTRU to start acting as a GWTRU.

Triggers, such as existing triggers, may be enhanced for group triggering and/or communication. A method may be implemented that may indicate to a recipient WTRU that a message is for group triggering, for example, if an SMS trigger is used. An IE may be used in an SMS message (e.g., as part of the TP header, CP header, another header, and/or the like) that may provide an indication that the message is for group triggering. A value for an IE may be used (e.g., a value may be set for a TP-Protocol-Identity). A value for an IE may indicate that a message is for group trigger.

A WTRU may have a memory and processor. For example, the WTRU may have processor configured to receive an MTC triggering message from a GWTRU. The triggering message may include an indication, such as an action indication. The indication may inform the method a recipient WTRU may use to trigger a group of WTRUs. For example, an indication may be used to inform a recipient WTRU that the PC5 interface may be used, an IP packet may be sent over PC5, and/or an SMS may be sent over PC5, etc. The WTRU may have a processor configured to analyze the MTC triggering message to determine the action indication. The WTRU may have a processor configured to send, based on the determined action indication, a request for data to an AS. The WTRU may have a processor configured to contact the ProSe server or ProSe function. The WTRU may have a processor configured to send a confirmation indication to the GWTRU The WTRU may have a processor configured to receive a triggering message from a server. The server may be an application server or a proximity service (ProSe) function. The triggering message may comprise an indication to initiate an action. The action may comprise transmission over a direct link. The action may comprise transmission of discovery over a direct link. The WTRU may have a processor configured to send a response message to the server. The response message may indicate the receipt of the triggering message. The WTRU may have a processor configured to initiate, based on the triggering message, the action. The WTRU may have a processor configured to initiate transmission of discovery over the direct link based, for example, on at least one preconfigured ProSe parameter.

Message content may include one or more of the indications or information described herein. Information may be included in a trigger message. Information that may be included in a trigger message may be the group that is being triggered (e.g., group ID), a list of individual WTRU identities, the time to trigger (e.g., per WTRU), IP address to use, the layer 2 address to use for PC5 (e.g., direct ProSe communication), and/or the like. Information may be included in a trigger message, for example, as part of a new IE, existing IE, or an SMS message.

A trigger message may include information for a recipient WTRU (e.g., what the recipient may do next). For example, the information may include one or more of the following. A trigger message may indicate an action a recipient WTRU may perform (e.g., trigger a group of WTRUs, identify a group, initiate discovery over a PC5 reference point etc.). A trigger message may indicate a method for trigger (e.g., IP over PC5, SMS over IP, over PC5, SMS over PC5, etc.). A trigger message may include relevant parameters that may be used for direct one-to-many communication over PC5

(e.g., layer 2 source/destination ID, group ID, IP address, etc.), such as if PC5 is to be used. The WTRU may be configured with this information per group ID and may, based on the trigger message and/or group ID for which this is sent, use the preconfigured information to take an action, e.g., to trigger other devices over PC5 with the ProSe parameters, as per configuration in the WTRU.

A trigger message may indicate a group ID. A trigger message may indicate an ID of one WTRU to trigger. A trigger message may indicate a time to trigger. A trigger message may indicate that a recipient WTRU may contact an AS and/or a ProSe function. When this is done, an AS and/or ProSe function may provide an action (e.g., as described herein) and/or information (e.g., as described herein) to a recipient WTRU. A trigger message may indicate that a recipient WTRU may listen to MBMS sessions, such as identified by a TMGI. MBMS sessions, such as identified by a TMGI, may be included in a trigger message.

A trigger message may indicate that a recipient WTRU may fetch data (e.g., using unicast or MBMS, etc.). A trigger message may indicate that a recipient WTRU may forward information to a WTRU, for example, using PC5 one-to-many ProSe communications. For example, a GWTRU may act as a relay for other WTRUs in a group. A trigger message may indicate an action to report the number of WTRUs that may be assigned to a GWTRU. A trigger message may indicate an action to report the number of WTRUs for which a GWTRU may have context. A trigger message may indicate an action to contact a GWTRU, for example, over PC5 reference point. A trigger message may indicate an action to contact a GWTRU, for example, by ProSe parameters that may be provided in a trigger message and/or configured in a recipient WTRU. A trigger message may indicate the manner that a recipient WTRU may trigger WTRUs (e.g., randomized in time, using a configured timing manner, using timing information received in the trigger message, using timing information from the AS, using timing information from the ProSe server, and/or the like).

A trigger message may indicate that the triggering message is applicable to a plurality of WTRUs. The GWTRU may be configured to receive the trigger message indicating that the triggering message is applicable to a plurality of WTRUs. The GWTRU may determine a group identification for the plurality of WTRUs based on the MTC triggering message. The GWTRU may translate the determined group identification for the plurality of WTRUs to a plurality of individual WTRU identifications for one or more (e.g., each) WTRU in the plurality of WTRUs. The GWTRU may send the MTC triggering message to the plurality of WTRUs.

A recipient WTRU may be a non-GWTRU. A recipient WTRU may receive all and/or any combination of information. Methods and procedures relating to recipient WTRUs described herein apply equally to non-GWTRUs (e.g., WTRU1, WTRU2, WTRU3).

Figure 13:
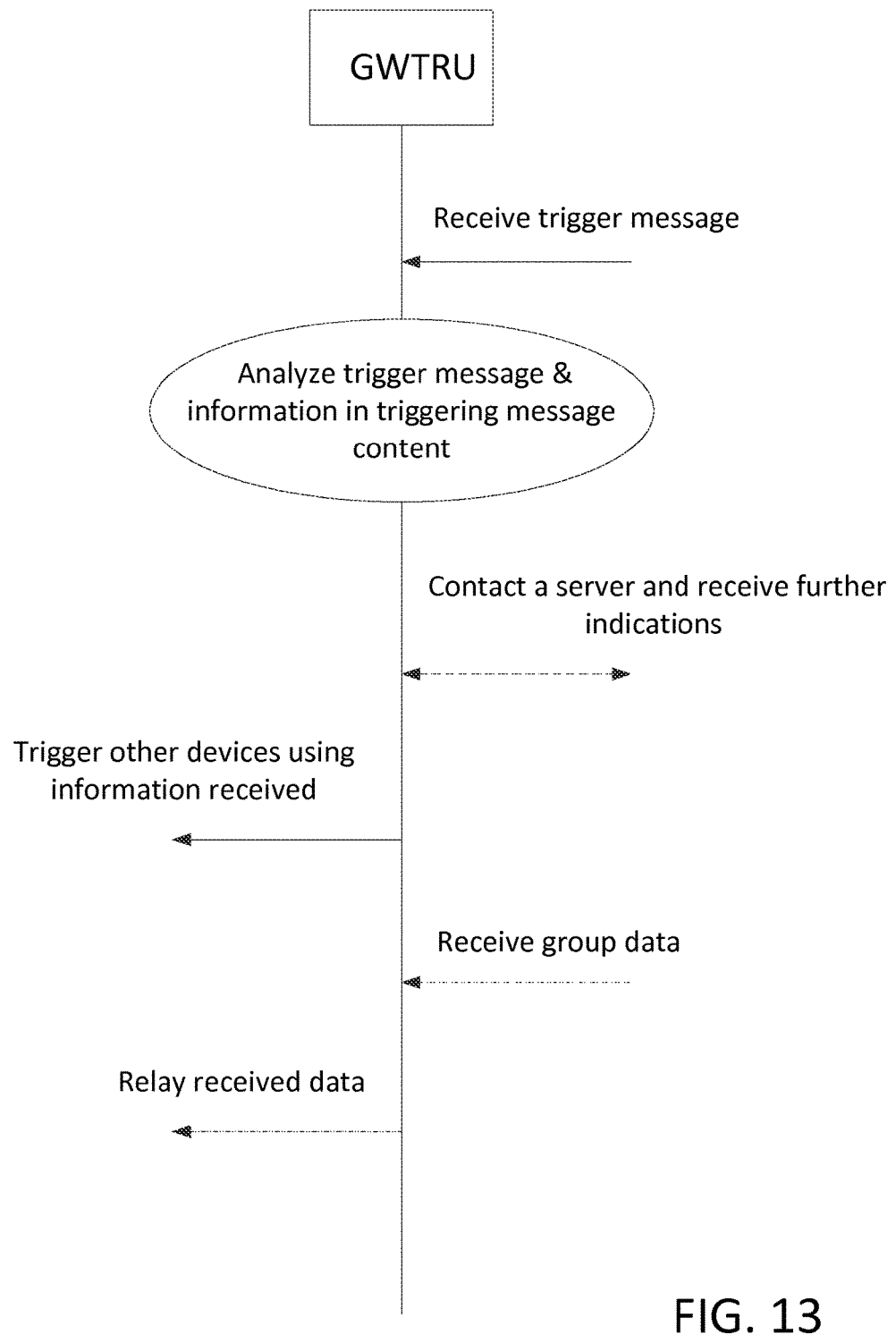
FIG. 13 is an example of a messaging chart associated with triggering functions of a GWTRU.

FIG. 13 is an example of a messaging chart associated with triggering functions of a GWTRU. In FIG. 13, a GWTRU may receive a trigger message, such as a triggering message described herein. The GWTRU may analyze the trigger message. For example, the GWTRU may analyze the information contained in the trigger message. The GWTRU may contact a ProSe server, for example, over the PC3 interface or IP interface. The GWTRU may contact the AS, for example, after the GWTRU analyzes the trigger message content. The GWTRU may request further indications from the ProSe Server or AS. The ProSe server or AS may send further indications to the GWTRU. The GWTRU may trigger other WTRUs over the PC5 (e.g., IP or SMS) interface, for example, using information received in the trigger message and/or information received from the ProSe server or AS. The GWTRU may receive group data, for example, over unicast or MBMS. Group data may be data intended for one or more WTRUs. The GWTRU may relay the receive group data to the other WTRUs, for example, over the PC5 interface.

Figure 14:
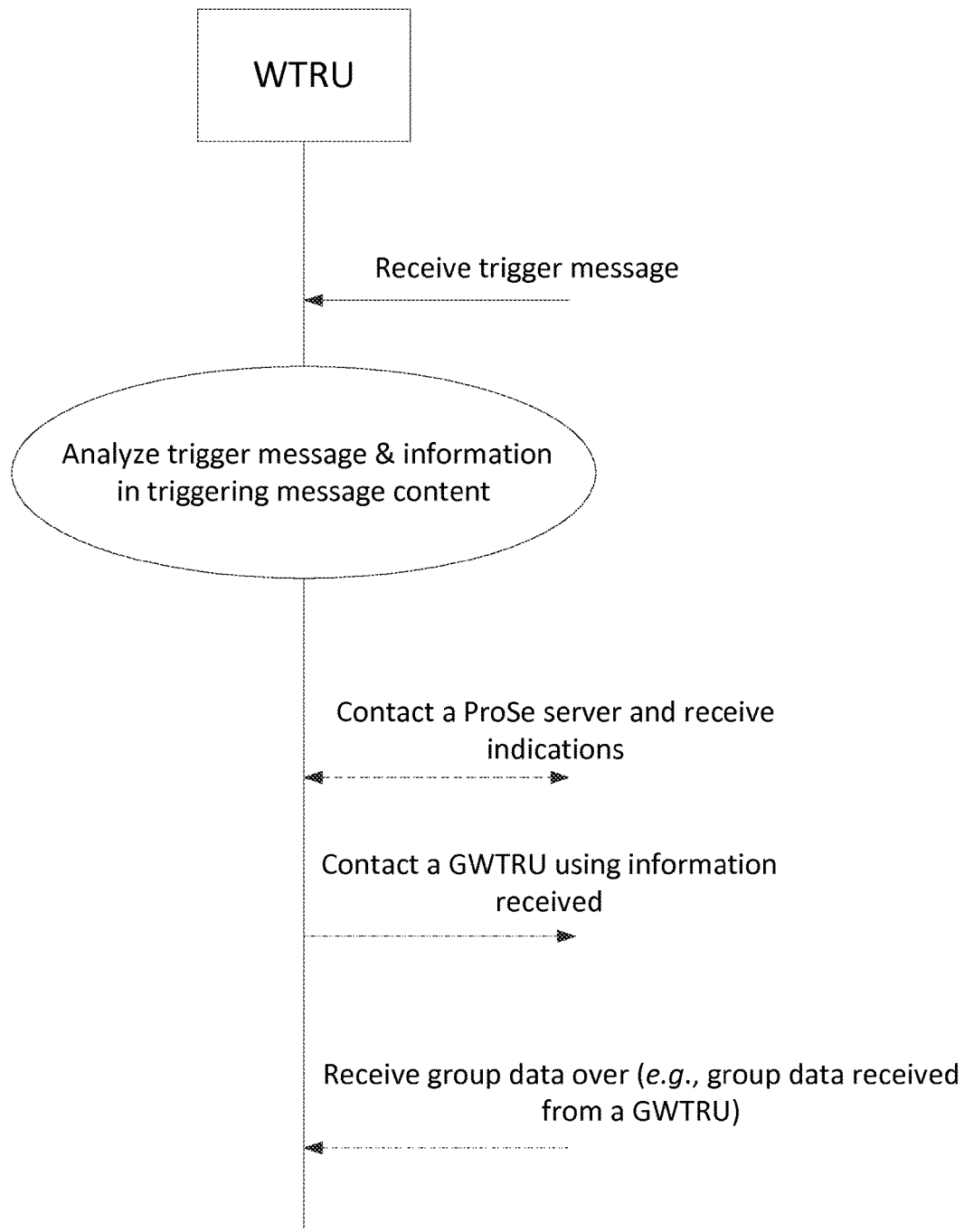
FIG. 14 is an example of a messaging chart associated with triggering functions of a non-GWTRU.

Non-GWTRUs may receive a trigger message (e.g., SMS using existing R11). FIG. 14 is an example of a messaging chart associated with triggering functions of a non-GWTRU. In FIG. 14, a WTRU may receive a trigger message from a GWTRU, for example, via the PC5 interface. A trigger message (e.g., received by a non-GWTRU) may contain information and/or actions that may be taken by a WTRU, such as when previous group triggering over PC5 may not have been successful in having WTRUs contact, for example, a ProSe function, AS or a GWTRU. The WTRU may analyze the trigger message. For example, the WTRU may analyze the information contained in the trigger message. The WTRU may contact the ProSe server, for example, via the PC3 interface or IP interface, to request further indications. The WTRU may contact the AS to request further indications. The WTRU may receive further indications from the ProSe server or AS. The WTRU may contact the GWTRU using information or the further indications received from the ProSe server and/or AS. The WTRU may receive group data over unicast or MBMS. The WTRU may receive the group data from a GWTRU, for example, via the PC5 interface. An AS, ProSe server, and/or GWTRU may track WTRUs that may have responded to triggering within a time window. An AS, and/or the like, may send a direct trigger message, for example, if no contact is made by a WTRU. The WTRU may send a confirmation message to the GWTRU indicating that it received the trigger message.

A GWTRU may be configured to maintain a count of non-GWTRUs that may be behind a WTRU. A GWTRU may be configured to maintain the identity of a WTRU, such as a WTRU that a non-GWTRU may be behind. A GWTRU may be configured to maintain group information, such as group ID and/or the number/ID of WTRUs that belong to a group, etc. A GWTRU may be configured to maintain the ID of a GWTRU that a WTRU may be behind. A GWTRU may be configured to maintain the ID of a GWTRU that a WTRU may be connected to.

A GWTRU may be configured to send a periodic message (e.g., registration) to a GWTRU. A GWTRU may be configured to send a periodic message to a GWTRU to indicate, for example, presence in the group and/or the group ID for which a message may be sent. A GWTRU may be configured to send the ID of a WTRU that may be sending information. A GWTRU may be configured to send periodic count of non-GWTRU to an AS, ProSe server, the CN, etc.

A GWTRU may be configured to maintain the number of triggers sent and/or received per group ID. A GWTRU may be configured to report the number of triggers sent and/or received per group ID. A GWTRU may be configured to maintain a list of WTRU IDs that may have responded, for example, to a group trigger. A GWTRU may be configured to maintain a list of WTRU IDs that may not have responded, for example, to a group trigger. A GWTRU may be configured to report information to the AS, ProSe server, CN, etc. A GWTRU may be configured to maintain security context for a group. A GWTRU may be configured to maintain PC5 parameters, for example, as provided in configurations, from the CN, ProSe server and/or AS, etc. A GWTRU may be configured to use PC5 parameters, for example, as provided in configurations, from the CN, ProSe server and/or AS, etc. A GWTRU may be configured to maintain GCSE parameters (e.g., TMGI), for example, as provided in configurations, from the CN, ProSe server and/or AS, etc. A GWTRU may be configured to maintain the time of receiving a trigger message.

A GWTRU may be configured to acknowledge the receipt of a group trigger for a group of WTRUs (e.g., as identified by a group ID). A GWTRU may be configured to acknowledge the receipt of an individual trigger message. The acknowledgement may be in the SMS layer, such as where the group ID may be included in an IE. The acknowledgement may be in a value for an IE. The acknowledgement may be over IP towards the AS, and/or the like. The acknowledgement may be over the ProSe server and/or the like. The acknowledgement may be over NAS towards the MME, SGSN, or MSC/VLR, etc. An acknowledging WTRU may include its identity. An acknowledging WTRU may include whether the ACK is for a group (e.g., group ID, individual WTRU), and/or the like. An acknowledging WTRU may include the application ID, and/or the like. An acknowledging WTRU may include the time of receiving the trigger message, and/or the like.

Figure 18:
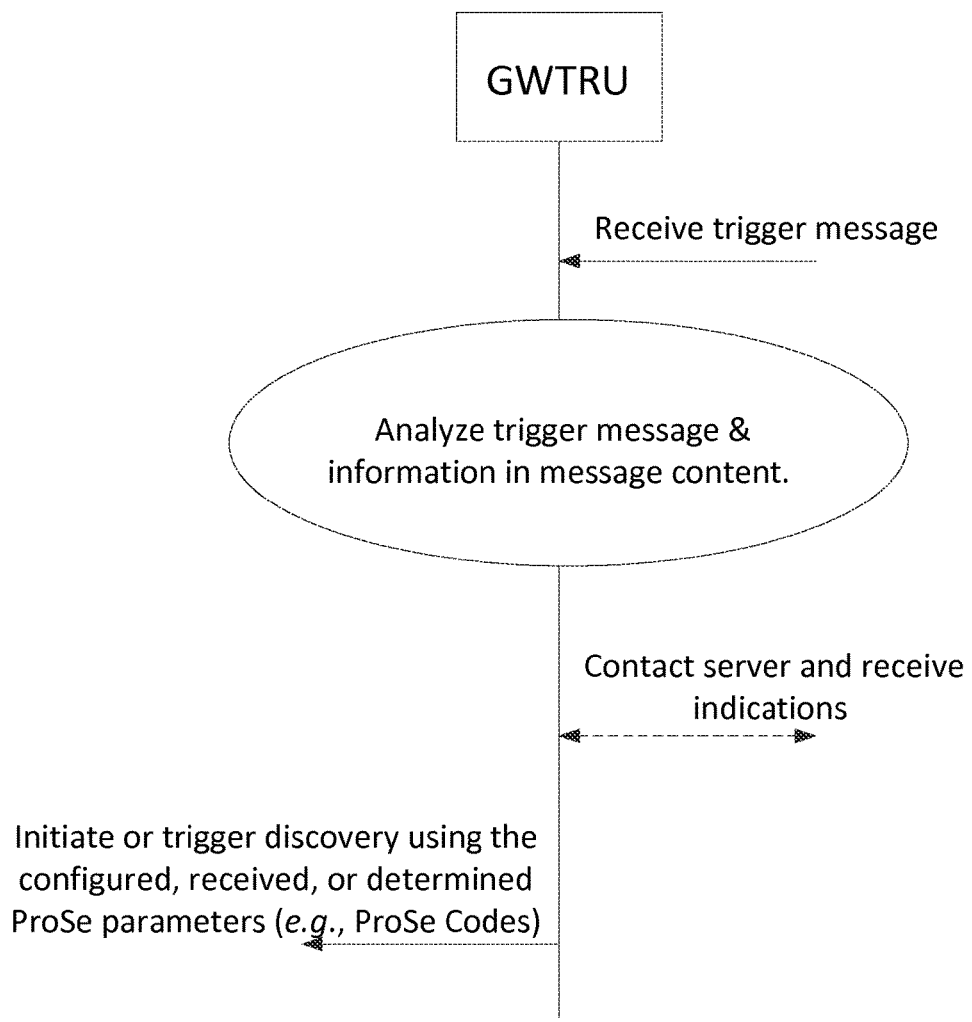
FIG. 18 is an example of a messaging chart associated with triggering functions of a GWTRU.

A GWTRU may be configured to initiate discovery, such as discovery over the PC5 interface. A GWTRU may be configured to trigger discovery. FIG. 18 is an example of a messaging chart associated with triggering functions of a GWTRU. A GWTRU may be configured to initiate or trigger discovery when a trigger message is received. For example, the GWTRU may analyze the trigger message. The content of the trigger message may contain an action for the GWTRU to take (i.e., such as described herein). For example, the action in the trigger message may indicate that discovery may be initiated or triggered by the GWTRU.

The GWTRU may be configured to initiate or trigger a type of discovery when it receives a trigger message (e.g., Model A discovery, Model B discovery). The GWTRU may be configured with a ProSe Code to use for the discovery. The trigger message may contain information related to the action to be taken by the GWTRU and/or the parameters to use, such as ID or reference to a previously configured or allocated set of ProSe parameters (e.g., ProSe Codes). The trigger message may indicate the type of discovery to be initiated or triggered by the GWTRU. The trigger message may comprise information related to the ProSe parameters (e.g., ProSe Codes) to use in the discovery. ProSe Codes may be examples of ProSe parameters and/or other parameters that may be used for direct discovery, relay discovery, group discovery, etc. ProSe Codes may be configured in the WTRU or included in the trigger message. The trigger message may be an IP message, an SMS, or any other message received via a PC5 interface from another WTRU. The trigger message may be a message received from an SCS/AS, a ProSe Server, or any other network node. The trigger message may be an NAS message that may be received from a network node, such as an MME, SGSN, etc. The trigger message may be an RRC message that is sent by the eNB. The eNB may send this message after it receives it from the MME, or any other node.

A GWTRU may be pre-configured with the ProSe parameters to be used in the discovery that is initiated when a trigger message is received. The GWTRU may be preconfigured with the ProSe parameters from the SCS/AS, ProSe Function, or any other network node. For example, in FIG. 18, a GWTRU may receive a trigger message. The message may be an SMS message, an IP message (e.g., from the SCS/AS or the ProSe Server), a message over PC5, or a NAS message, or RRC message (e.g., that may have been received from the eNB), or any other protocol message that may be used. The GWTRU may analyze the content of the received trigger message. The GWTRU may be configured to act as a GWTRU to initiate or trigger discovery over PC5 reference point. The GWTRU may have received such configuration. The trigger message may include an indication or configuration for the GWTRU to initiate a discovery on the PC5 interface. The GWTRU may be configured or preconfigured with ProSe parameters (e.g., one or more ProSe Codes) that may be used for the discovery. The trigger message may comprise information related to the ProSe parameters and/or the ProSe parameters. The ProSe parameters may be parameters that may be used for any discovery, such as Model A, Model B, relay discovery, etc. The GWTRU may determine the ProSe parameters that may be used for the discovery.

In FIG. 18, the GWTRU may optionally contact the SCS/AS, ProSe Server, and/or ProSe function. For example, the GWTRU may send a response message to the ProSe Function. The response message may indicate the receipt of a trigger message. The GWTRU may receive, from the contacted entity information related to an action or ProSe parameters. The GWTRU may initiate discovery, for example, on the PC5 reference point. The GWTRU may use some or all ProSe parameters (e.g., one or more ProSe Codes). The GWTRU may indicate in the discovery message that discovery may be initiated as a result a trigger message that may be received from another entity. The GWTRU may optionally indicate the source of the trigger message. The source information may be any identification information, such as an application ID, ProSe Server ID (e.g., Fully Qualified Domain Name), APN, source IP address, source Layer 2 address of the WTRU that may have sent this trigger message over PC5. The GWTRU may indicate or include in the discovery an indication related to whether trigger message was received from the MME or the eNB or any other node in the network.

A WTRU may receive the discovery message that may be sent by the GGWTRU. The WTRU may analyze the discovery message. The WTRU may respond to the message. The WTRU may take an action indicated in the discovery message, such as contacting the ProSe Server. The WTRU may verify the ProSe parameters used in the received discovery message. The WTRU may be configured with ProSe parameters that may be used in discovery messages received from other WTRUs. The WTRU may compare the received ProSe parameters against its preconfigured ProSe parameters. A WTRU may have access to a ProSe Code. The WTRU may indicate that the discovery message may be a result of a trigger message that was received by the entity that sent this discovery message. The received ProSe parameters may refer to an action that may be performed by the recipient of the discovery message. For example, the actions may include contacting the SCS/AS, ProSe Server, or the source WTRU over PC5.

A trigger message on a Tsp interface may be used. For example, an MTC triggering message may be an SMS. The SMS message may include an information element. The information element may include an indication that the SMS message is applicable to a plurality of WTRUs. The information element is in the transfer protocol (TP) header or the control protocol (CP) header. For example, an SMS destined for a defined/indicated group ID over the Tsp interface may be used. The IWF may trigger an SMS to one or more (e.g., each) WTRU(s) that may be part of the group.

Figure 15:
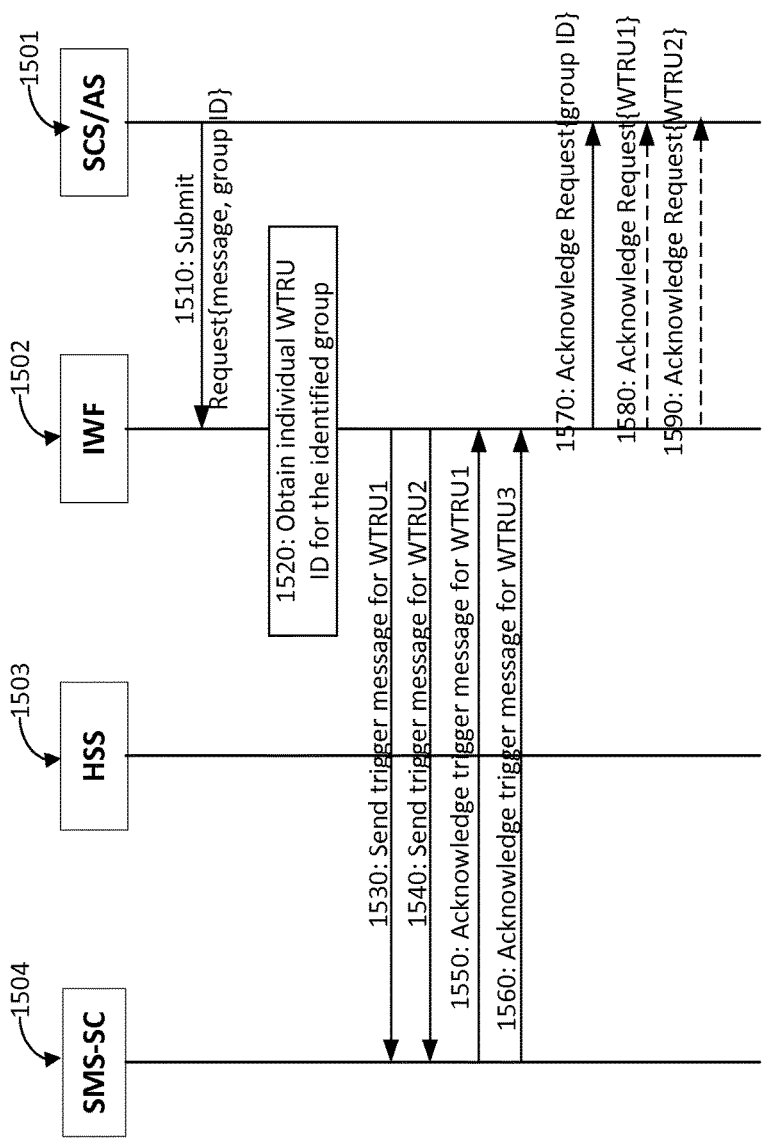
FIG. 15 is an example messaging chart associated with triggering functions using an SMS.

FIG. 15 is an example messaging chart associated with triggering functions using an SMS. At 1510, an SCS/AS

1501 may submit a trigger request to an IWF 1502. The IWF 1502 may be an MME. The trigger request may include a message and/or a group identification. The trigger request may be an MTC triggering message that may be applicable to a group of MTC devices. The SCS/AS 1501 may include a group ID, for example, to identify the group for which the trigger may be intended. The IWF 1502 may receive the trigger request.

At 1520, the IWF 1502 may obtain individual WTRU identifications for the group identified in the trigger request sent from the SCS/AS 1501. For example, the IWF 1502 may translate the group identification from the MTC triggering message to a one or more WTRU identifications. The IWF 1502 may maintain a mapping of group ID to individual WTRU members. The IWF 1502 may use triggering mechanisms (e.g., over SMS). For example, the IWF 1502 may generate individual trigger messages to member WTRUs using a triggering mechanism (e.g., over SMS) based on a mapping of group ID to WTRU members maintained by an IWF 1502. The IWF 1502 may trigger individual SMS messages to one or more (e.g., each) of the WTRU identifications.

At 1530, the IWF 1502 may send a trigger message to SMS-SC 1504 that is intended for WTRU1. At 1540, the IWF 1502 may send a trigger message to SMS-SC 1504 that is intended for WTRU2. At 1550 and 1560, the SMS-SC 1504 may acknowledge the transmission of a trigger, for example, after trigger messages may have been sent to individual WTRUs (e.g., WTRU1 and WTRU2). At 1570, the IWF 1502 may acknowledge the submission of a trigger, for example, after trigger messages may have been sent to individual WTRUs. For example, the IWF 1502 may acknowledge the submission of the trigger by sending an ACK to the SCS/AS 1501. The IWF 1502 may ACK when the IWF 1502 receives acknowledgement from an SMS-SC 1504 for member WTRUs (e.g., WTRU1 and WTRU2). The IWF 1502 may send an ACK, for example, for WTRUs that are part of a group.

At 1580 and 1590, the IWF 1502 may indicate that an ACK may not have been received for one or more WTRUs. The IWF 1502 may send an acknowledgement request to the SCS/AS 1501. The IWF 1502 may indicate to the SCS/AS 1501 the group ID for WTRUs, such as a WTRU that may not have received an ACK. The IWF 1502 may indicate to the SCS/AS 1501 a WTRU ID for WTRUs, such as a WTRU that may not have received an ACK.

Figure 16:
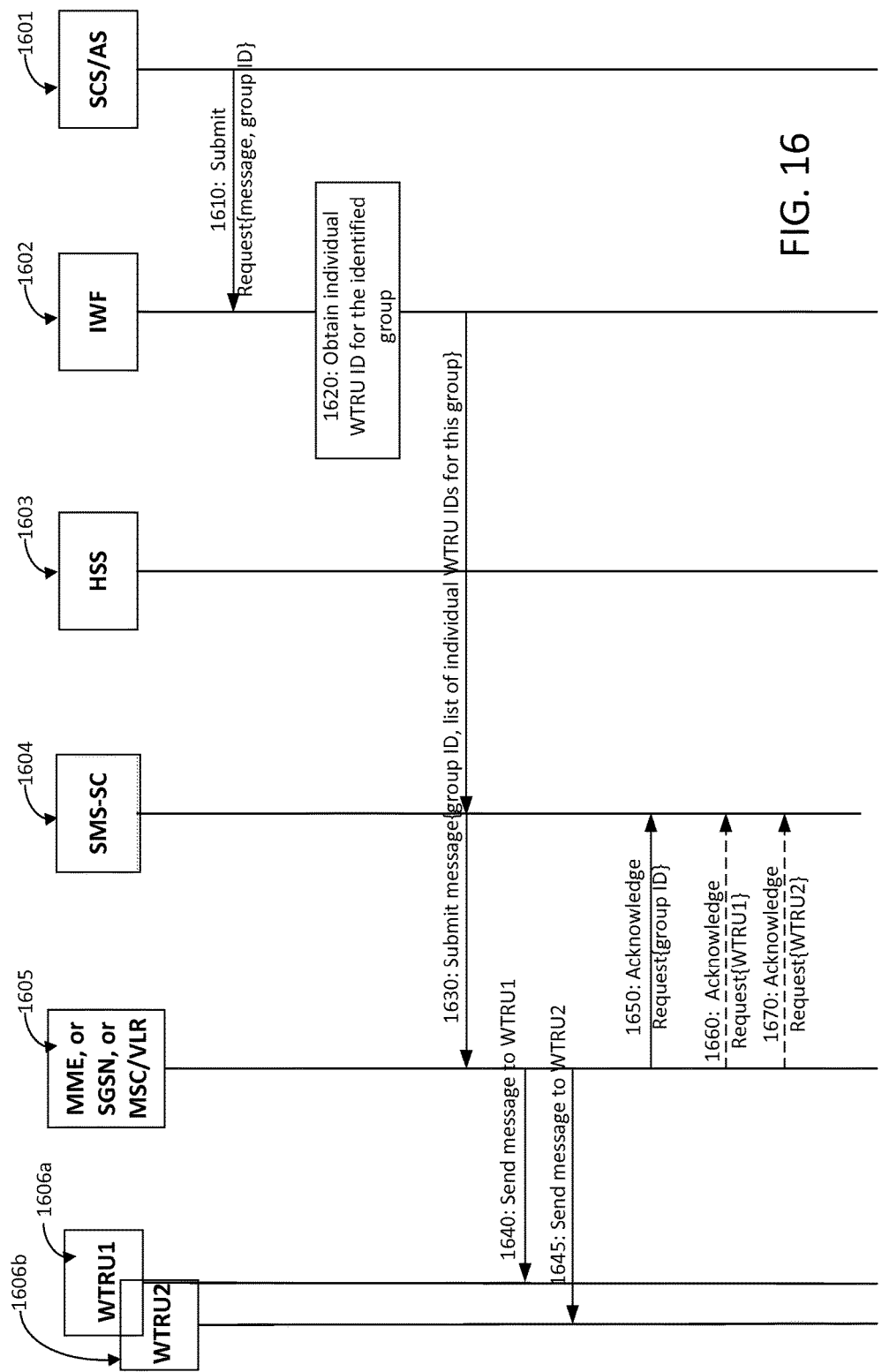
FIG. 16 is an example messaging chart associated with triggering functions using an SMS.

FIG. 16 is an example messaging chart associated with triggering functions using an SMS. At 1610, an SCS/AS 1601 may submit a trigger request to an IWF 1602. The trigger request may include a message and/or a group identification. The SCS/AS 1601 may include a group ID, for example, to identify the group for which the trigger may be intended. The IWF 1602 may receive the trigger request. At 1620, the IWF 1602 may obtain individual WTRU identifications for the group identified in the trigger request sent from the SCS/AS 1601. The IWF 1602 may maintain a mapping of group ID to individual WTRU members. The IWF 1602 may use triggering mechanisms (e.g., over SMS). For example, the IWF 1602 may generate individual trigger messages to member WTRUs using a triggering mechanism (e.g., over SMS) based on a mapping of group ID to individual WTRU members maintained by an IWF 1602.

At 1630, the MME 1605 may receive a request to transmit an SMS, for example, over the T5 interface from the IFW 1602 and/or from the SMS-SC 1601. The request may include the group ID. The MSISDN used for an SMS may be a group-MSISDN. Nodes involved in the SMS transmission may contain information (e.g., group ID, group-MSISDN, list of member WTRU ID, etc.). The MME 1605 may receive the request to transmit the SMS.

At 1640 and 1645, the MME 1605 may send a replica (e.g., the same SMS message) to member WTRUs 1606a/1606b. The MME 1605 may forward the SMS message to the member WTRUs 1606a/1606b. The MME 1605 may send the SMS message at reception or after reception of a request. The WTRUs 1606a/1606b may receive the SMS message sent by the MME 1605.

At 1650, the MME 1605 may send an acknowledgement to an SMS-SC 1604, for example, on behalf of the WTRUs 1606a/1606b. The SMS-SC 1604 may receive the acknowledgement. At 1660 and 1665, the MME 1605 may forward all, some and/or individual ACK (e.g., on the SMS level the MME 1605 may not process or understand) to the SMS-SC 1604. The SMS-SC 1604 may receive the ACKs.

Figure 17:
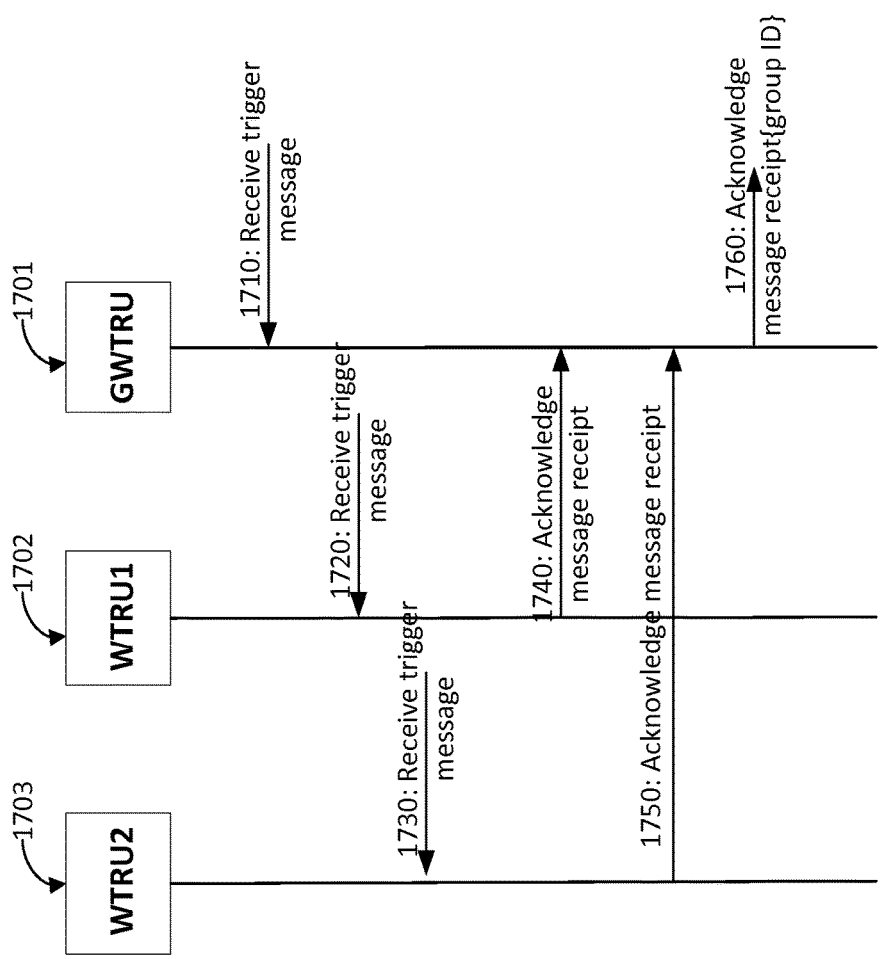
FIG. 17 is an example messaging chart associated with triggering functions for a GWTRU using an SMS.

FIG. 17 is an example messaging chart associated with triggering functions for a GWTRU using an SMS. At 1701, a GWTRU 1701 may receive a trigger message, for example, from an MME, SCS/AS, IWF, etc. (e.g., as shown in FIGS. 15 and 16). At 1720, the GWTRU 1701 may send the received trigger message to WTRU1 1702. The WTRU1 1702 may receive the trigger message. At 1730, the WTRU1 1702 may send the trigger message to another WTRU, WTRU2 1703. The WTRU2 1703 may receive the trigger message. At 1740, the WTRU1 1702 may send an acknowledgment that the trigger message was received to the GWTRU 1701. At 1750, the WTRU2 1703 may send an acknowledgment that the trigger message was received to the GWTRU 1701. The GWTRU 1701 may receive the ACKs from WTRU1 1702 and/or WTRU2 1703. At 1760, the GWTRU 1701 may send an ACK for a group, such as after a GWTRU 1701 may receive an ACK from member WTRUs (e.g., WTRU1 1702 and/or WTRU2 1703).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) comprising:
a memory; and
a processor configured to:
send an indication that the WTRU is configured to be triggered to send messages to one or more other WTRUs over a direct link;
receive a triggering message from a proximity service (ProSe) function, wherein the triggering message indicates that a discovery message is to be sent by the WTRU over the direct link and the triggering message comprises a ProSe code;
send a response message to the ProSe function, wherein the response message indicates the receipt of the triggering message indicating that the discovery message is to be sent by the WTRU over the direct link and comprising the ProSe code; and transmit the discovery message using the ProSe code over the direct link based on the triggering message indicating that the discovery message is to be sent by the WTRU over the direct link.

2. The WTRU of claim 1, wherein the discovery message is transmitted over the direct link through a PC5 interface reference point.

3. The WTRU of claim 1, wherein the processor is further configured to initiate the transmission of the discovery message over the direct link based on at least one ProSe parameter.

4. The WTRU of claim 1, wherein the triggering message is a machine-type communication (MTC) triggering message.

5. The WTRU of claim 4, wherein the MTC triggering message is a short message service (SMS) message.

6. The WTRU of claim 1, wherein the indication that the WTRU is configured to be triggered to send the messages to the one or more other WTRUs over the direct link comprises configuration information related to direct communications to be performed by the WTRU.

7. The WTRU of claim 1, wherein the WTRU is capable of acting as a gateway WTRU (GWTRU).

8. A method for triggering a wireless transmit receive unit (WTRU), the method comprising:

the WTRU sending an indication that the WTRU is configured to be triggered to send messages to one or more other WTRUs over a direct link;

the WTRU receiving a triggering message from a proximity service (ProSe) function, wherein the triggering message indicates that a discovery message is to be sent by the WTRU over the direct link and the triggering message comprises a ProSe code;

the WTRU sending a response message to the ProSe function, wherein the response message indicates the receipt of the triggering message indicating that the discovery message is to be sent by the WTRU over the direct link and comprising the ProSe code; and the WTRU transmitting the discovery message using the ProSe code over the direct link based on the triggering message indicating that the discovery message is to be sent by the WTRU over the direct link.

9. The method of claim 8, wherein the discovery message is transmitted over the direct link through a PC5 interface reference point.

10. The method of claim 8, wherein the transmission of the discovery message is initiated over the direct link based on at least one ProSe parameter.

11. The method of claim 8, wherein the triggering message is a machine-type communication (MTC) triggering message.

12. The method of claim 11, wherein the MTC triggering message is a short message service (SMS) message.

13. The method of claim 8, wherein the indication that the WTRU is configured to be triggered to send the messages to the one or more other WTRUs over the direct link comprises configuration information related to direct communications to be performed by the WTRU.

14. The method of claim 8, wherein the WTRU is capable of acting as a gateway WTRU (GWTRU).

15. The method of claim 8, wherein the triggering message comprises an identification.

16. The WTRU of claim 1, wherein the triggering message comprises an identification.

17. The WTRU of claim 1, wherein the triggering message comprises information associated with an application for which the triggering message is sent.

18. The WTRU of claim 1, wherein the direct link comprises a PC5 interface.

19. The method of claim 8, wherein the triggering message comprises information associated with an application for which the triggering message is sent.

20. The method of claim 8, wherein the direct link comprises a PC5 interface.

* * * * *